United States Patent
Duque et al.

(10) Patent No.: US 12,401,510 B2
(45) Date of Patent: Aug. 26, 2025

(54) SYSTEMS AND METHODS FOR USER CONTROL AND EXCLUSION OF CRYPTOGRAPHIC TOKENIZED DATA

(71) Applicant: Capital One Services, LLC, McLean, VA (US)

(72) Inventors: Julian Duque, Arlington, VA (US); Purva Shanker, Arlington, VA (US); Samuel Rapowitz, Roswell, GA (US); Dennis Liu, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 264 days.

(21) Appl. No.: 17/931,507

(22) Filed: Sep. 12, 2022

(65) Prior Publication Data

US 2024/0089105 A1    Mar. 14, 2024

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC .............. H04L 9/3213; H04L 9/00–50; H04L 2209/00–88; H04L 63/00–308; H04L 2463/00–146; G06F 21/00–88; G06F 2221/00–2153
See application file for complete search history.

(56) References Cited

U.S. PATENT DOCUMENTS

| | | | |
|---|---|---|---|
| 9,374,373 B1 * | 6/2016 | Chan | H04L 9/3247 |
| 9,419,841 B1 * | 8/2016 | Kozolchyk | H04L 9/3239 |
| 9,722,974 B1 * | 8/2017 | Fuller | H04L 9/0836 |
| 12,244,667 B1 * | 3/2025 | Bogu | H04L 67/1095 |
| 12,277,247 B2 * | 4/2025 | Jakobsson | H04L 9/30 |
| 2007/0253549 A1 * | 11/2007 | Celikkan | G06F 21/602 |
| | | | 380/42 |
| 2008/0137845 A1 * | 6/2008 | Wood | H04L 63/164 |
| | | | 380/33 |
| 2014/0164760 A1 * | 6/2014 | Hybertson | H04N 21/4627 |
| | | | 713/153 |
| 2017/0289104 A1 * | 10/2017 | Shankar | H04L 63/166 |
| 2020/0084027 A1 * | 3/2020 | Duchon | G06F 21/602 |
| 2020/0162246 A1 * | 5/2020 | Schouppe | H04L 9/0894 |
| 2020/0313897 A1 * | 10/2020 | Heath | H04W 12/47 |
| 2020/0379868 A1 * | 12/2020 | Dherange | G06N 20/20 |
| 2022/0052988 A1 * | 2/2022 | Gadnis | H04L 63/0464 |
| 2022/0173893 A1 * | 6/2022 | Basu | H04L 9/3247 |
| 2024/0086549 A1 * | 3/2024 | Rapowitz | G06F 21/6245 |
| 2024/0412208 A1 * | 12/2024 | Loreth | H04L 9/3247 |
| 2025/0028790 A1 * | 1/2025 | Finlow-Bates | G06F 21/1014 |
| 2025/0030546 A1 * | 1/2025 | Stange | H04L 9/3239 |

\* cited by examiner

*Primary Examiner* — Rupal Dharia
*Assistant Examiner* — Raghavender Cholleti
(74) *Attorney, Agent, or Firm* — Foley & Lardner LLP

(57) ABSTRACT

The invention relates to generating cryptographic tokens based on received records. The system may receive a blockchain operation request comprising a plurality of records, encrypt a plurality of records into an encrypted payload, generate a cryptographic token based on the encrypted payload, and cause the cryptographic token to be committed to a blockchain.

20 Claims, 9 Drawing Sheets

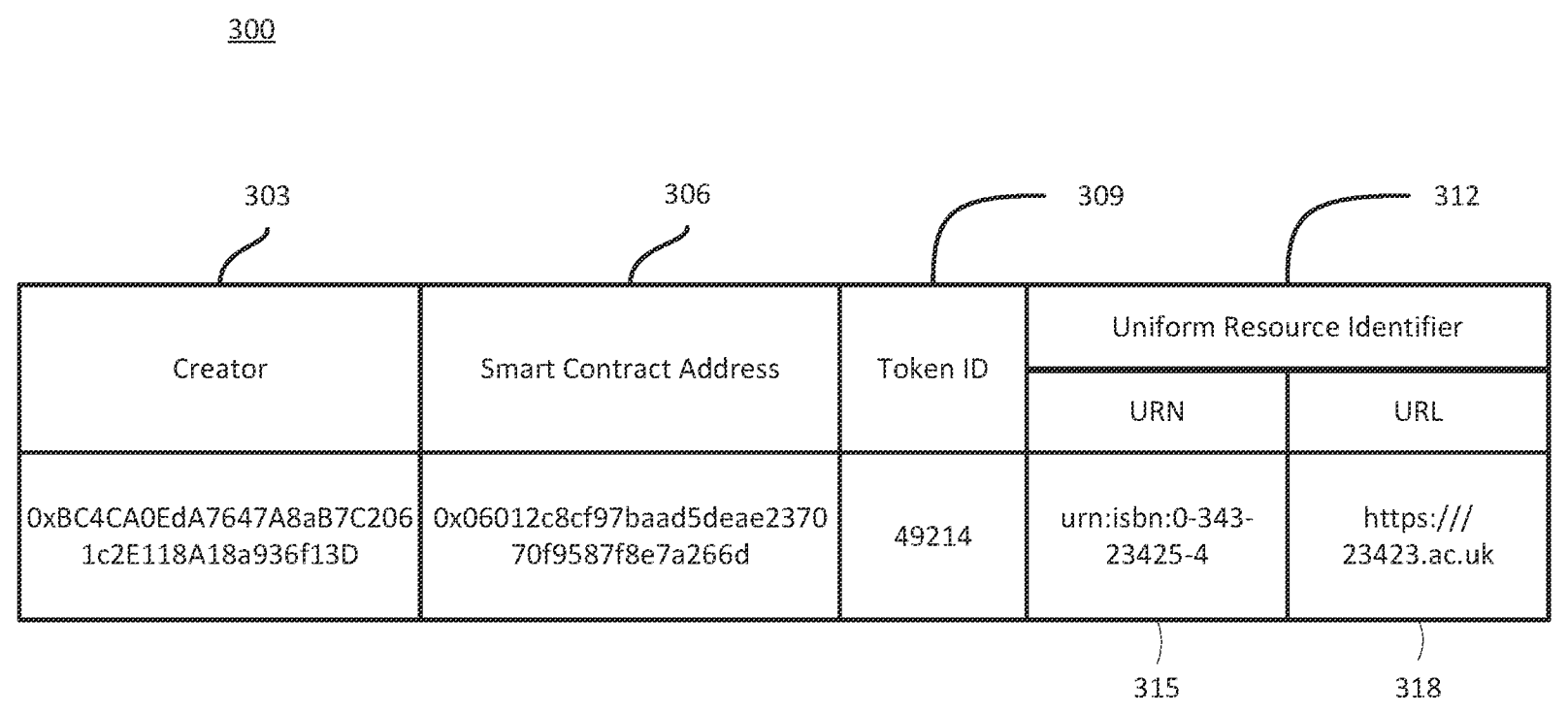

| Creator | Smart Contract Address | Token ID | Uniform Resource Identifier ||
|---|---|---|---|---|
| | | | URN | URL |
| 0xBC4CA0EdA7647A8aB7C206 1c2E118A18a936f13D | 0x06012c8cf97baad5deae2370 70f9587f8e7a266d | 49214 | urn:isbn:0-343-23425-4 | https:// 23423.ac.uk |

FIG. 3

SYSTEMS AND METHODS FOR USER CONTROL AND EXCLUSION OF CRYPTOGRAPHIC TOKENIZED DATA

BACKGROUND

As user-related data production, ranging from social to transactional, continues to increase exponentially, so does the need to understand and implement data management that is able to handle not only data privacy concerns, but also data ownership issues. In particular, data privacy encompasses setting access controls to protect information from unauthorized parties, acquiring consent from subjects of data, and maintaining data integrity throughout its lifespan. However, data ownership encompasses enabling a user to take back control and give it to another party, when desired. Even when stored completely securely, data subjects lose control of their data once it has been created. For example, users may lose granular control over their data upon the transfer of any data to a third party and have limited or no control over whether the data becomes deleted or changes hands in the future. As a result, conventionally, users may be forced to relinquish control of their data, such as itemized lists of possessed items, when giving access to another party. Subsequently, these users lose the ability to disable access to this data or modify permissions for those who may access this data, and lose the ability to exclude others from this data. This lack of control may lead to a reluctance to provide such information to entities that may even act with benevolent intentions in support of the user. The challenge is in stemming the subsequent propagation of this user data into the hands of other undesirable entities, in order to enable data sharing and subsequent use of this data only in cases with the data subject's consent.

SUMMARY

Methods and systems are described herein for generating cryptographic tokens to enable users to securely share data with desired entities and subsequently control access to this data by excluding other entities from access or removing access from originally desired entities and giving control to other entities. In addition, the entities that are given access to the data may utilize the data to determine user characteristics and provide users with badges based on their actions or behaviors. The system enables generation of a cryptographic token that contains user-protected information, which enables users to control their data through a cryptography-based storage application. As a result, the user may transfer control of the data securely through blockchain operations, with, for example, asymmetrical encryption, in order to provide access to entities that may use that data to provide services to the user. By encapsulating protected data within cryptographic tokens, the disclosure provides users with enhanced and secure control over their data, and enables users to share this data with other entities, which enables the entities to access the data only with permission of the original user. When a third party receives the protected information, with the consent of the corresponding user, the third party may subsequently analyze the data to determine user characteristics and generate a cryptographic token indicating these characteristics to reward the user or provide a personalized service. By using a cryptographic token to both receive and publish analyses of user data, third party entities may securely provide user services, where those services themselves are also protected through encryption and use of blockchain technology. By minting cryptographic tokens on the blockchain related to user characteristics derived from secure data, users may be rewarded for certain characteristics or behaviors in a secure way, and only at their consent to the use of their data. Thus, users are more likely to trust that their data will be used for desirable purposes and by desirable entities and may exercise better control over their data. Accordingly, the methods and systems described herein provide the benefit of enabling exclusionary control of the user's information when sharing data with other parties.

The system operates by receiving a request to generate a cryptographic token on a blockchain such that the cryptographic token may encapsulate or enable access to a plurality of records. That is, the records may be stored within the cryptographic token itself or in another location, the indication of which is stored within the cryptographic token. Specifically, the system may receive a blockchain operation request corresponding to a cryptography-based storage application that includes a plurality of records. Each of these records may include an identifier for an item. The plurality of records may originate from user-provided data, where the user, for example, may provide records for each item possessed. Using this mechanism, the system receives, via the request, only the data that the user consents to sharing.

The system may encrypt these records using, for example, a public key that is assigned to the cryptography-based storage application from which the request was received. That is, the system may encrypt the plurality of records into an encrypted payload using a public key associated with the cryptography-based storage application. Here, the system may use the public key of the user to encrypt the data, which may transform the data that contains the records of information into a form that may only be accessible to the original user, using the private key assigned to the user's cryptography-based storage application. For example, the encrypted payload may be a list of alphanumeric strings, each of which may be a record of an item, encrypted using an asymmetric algorithm; for example, the result of the encryption may be an elliptic curve cryptography-encrypted vector of bits.

The system may retrieve the encrypted payload and generate a cryptographic token based on the encrypted payload. In some embodiments, the system may generate a cryptographic token containing the encrypted payload. The cryptographic token may be controlled by the cryptography-based storage application of the user and may enable access to the encrypted payload using the cryptography-based storage application (e.g., using a private key associated with the cryptography-based application to decrypt the encrypted payload). For example, the system may encapsulate the encrypted payload in a non-fungible token (NFT), which is then stored on the blockchain and may be controlled by the cryptography-based storage application of the user such that the user associated with data may have access to this data within the token.

The system may then add the cryptographic token, encapsulating the itemized data, to a blockchain. For example, the system may cause the cryptographic token to be committed to a blockchain, which enables the user associated with the cryptography-based storage application to provide access to the plurality of records. In some implementations, the system may transmit the cryptographic token to a proof-of-work blockchain network where a miner may validate a block containing the token, thus committing the token to the blockchain network. This operation may enable the NFT to be added cryptographically to the network, for further secure sharing with other entities, if desired.

In some embodiments, the system may enable an entity, for example, an entity that has gained access to a cryptographic token, to interact with and analyze the cryptographic token or tokens after they are minted. The system may generate and transmit a request for the encrypted payloads contained in the cryptographic token. For example, the system may generate and transmit, to a blockchain node associated with a blockchain, a blockchain operation request for a plurality of encrypted payloads. The blockchain operation request may include one or more identifiers of one or more cryptographic tokens. Thus, this blockchain operation request may provide an identifier to the blockchain network of which cryptographic token, with its respective encapsulated, encrypted information, to access.

The system may then receive one or more encrypted payloads associated with a cryptographic token from the blockchain node. For example, the system may receive, from the blockchain node, in response to the blockchain operation request, the plurality of encrypted payloads that are associated with the one or more cryptographic tokens. The plurality of the encrypted payloads may have been encrypted using a first key (e.g., a public key) associated with a cryptography-based storage application. As a result of this operation, the system may receive the identified encrypted information associated with the requested cryptographic tokens, ready for decrypting.

The system may then decrypt the encrypted payloads. For example, the system may accomplish this by decrypting, using a second key (e.g., a private key) associated with the cryptography-based storage application, the plurality of encrypted payloads into a plurality of payload identifiers. As a result, a computing device associated with the decrypting cryptography-based storage application may access the encapsulated information. This information may be subsequently retrieved.

The system may retrieve the sets of items that have been decrypted from the encrypted payloads. For example, the system may receive, based on the plurality of payload identifiers, a plurality of sets of item identifiers. Thus, the system may receive the list of items or item identifiers that were first encapsulated in the cryptographic tokens and is now able to analyze those items further after having gained access to this information. These items may include sets of parts, for example, from a warehouse or another suitable set of items.

The system may determine characteristics associated with the items. For example, the system may determine one or more characteristics associated with a plurality of sets of items corresponding to the plurality of sets of item identifiers. By performing the determination, the system may evaluate user behavior and/or habits, for example, particular traits or characteristics, and may determine a characterization or category corresponding to the itemized information.

The system may also generate a new cryptographic token based on these characteristics. For example, the system may generate a new cryptographic token to be controlled by the cryptography-based storage application of the user. The new cryptographic token may indicate one or more characteristics. Thus, the system may represent or embody the characteristics identified in a new cryptographic token, which may act as a badge.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 shows an excerpt of a data structure for a generated cryptographic token, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
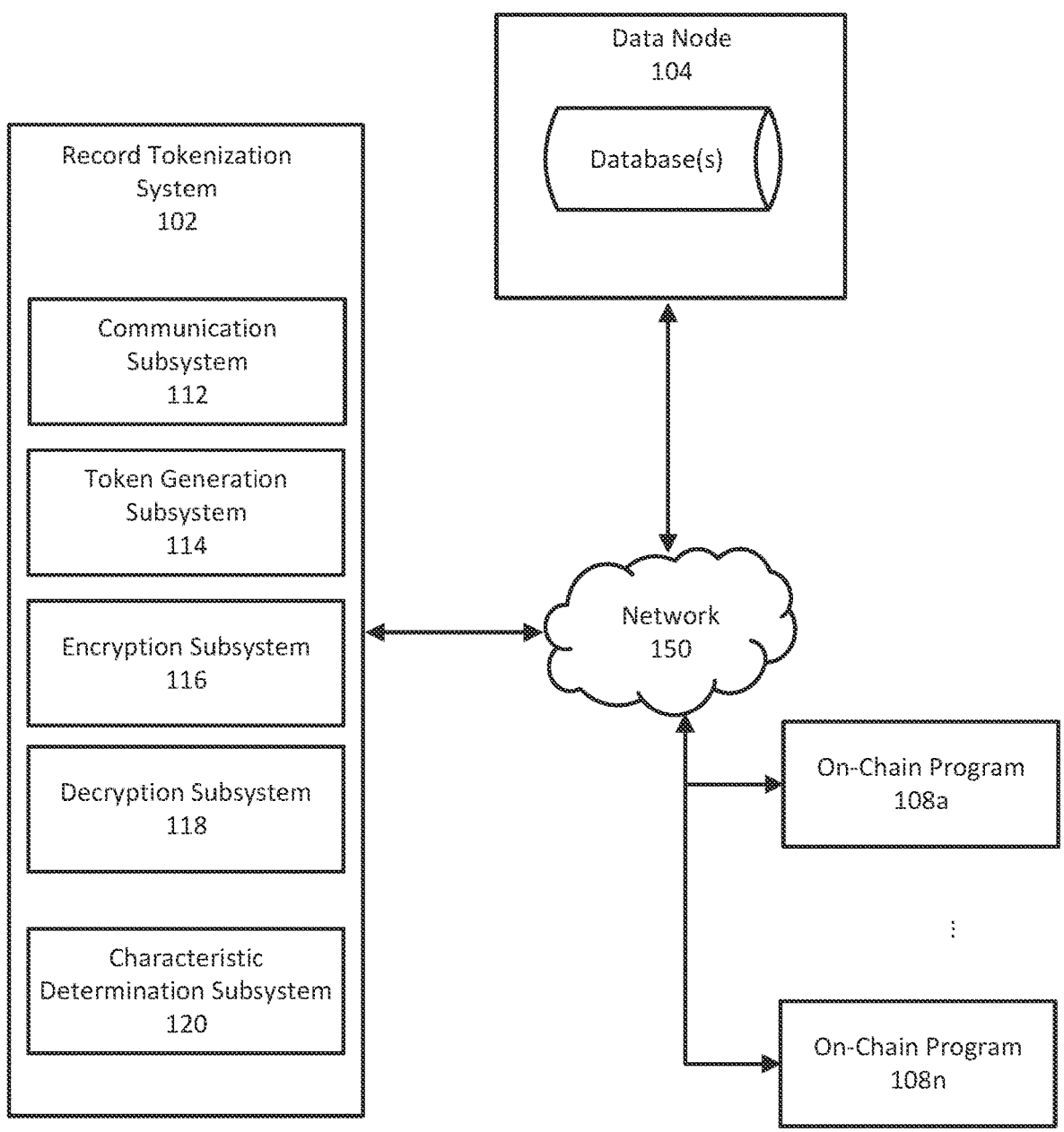
FIG. 1 shows an illustrative environment for the generating cryptographic tokens based on received records, in accordance with one or more embodiments.

FIG. 1 shows an illustrative environment for generating cryptographic tokens based on received records. Environment 100 includes record tokenization system 102, data node 104, and on-chain programs 108a-108n. Record tokenization system 102 may include software, hardware, or a combination of both and may reside on a physical server or a virtual server running on a physical computer system. In some embodiments, record tokenization system 102 may be configured on a user device (e.g., a laptop computer, a smart phone, a desktop computer, an electronic tablet, or another suitable user device). Furthermore, record tokenization system 102 may reside on a blockchain node and/or interface with on-chain programs either directly or indirectly.

Data node 104 may store various data, including one or more machine learning models, training data, itemized record data, encrypted payloads, public keys, and/or other suitable data. Data node 104 may include software, hardware, or a combination of the two. In some embodiments, record tokenization system 102 and data node 104 may reside on the same hardware and/or the same virtual server or computing device. Network 150 may be a local area network, a wide area network (e.g., the Internet), or a combination of the two. On-chain programs 108a-108n may reside on client devices (e.g., desktop computers, laptops, electronic tablets, smart phones, servers, and/or other computing devices that interact with a blockchain network).

Record tokenization system 102 may receive record data from one or more devices. Record tokenization system 102 may receive records using communication subsystem 112, which may include software components, hardware components or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as records, encrypted payloads or cryptographic tokens. Communication subsystem 112 may communicate with token generation subsystem 114, encryption sub system 116, decryption sub system 118, or characteristic determination sub system 120.

In some embodiments, record tokenization system 102 may include token generation subsystem 114. Token generation subsystem 114 may perform tasks that generate tokens from data. For example, token generation subsystem 114 may generate a token from a plurality of records, or from a set of characteristics. Token generation subsystem 114 may include software components, hardware components, or a combination of both. For example, token generation subsystem 114 may include software components, or may include one or more hardware components (e.g., processors) that are able to execute operations for generating tokens from record data. Token generation subsystem 114 may access data, such as records, public keys, or encrypted payloads, which may be stored, for example, in a memory system. Token generation subsystem 114 may directly access data or nodes associated with a blockchain network and may be able to transmit data to nodes associated with a blockchain network (blockchain nodes). Token generation subsystem 114 may, additionally or alternatively, receive data from and/or send data to encryption sub system 116, decryption sub system 118, or characteristic determination sub system 120.

Encryption subsystem 116 may execute tasks relating to encryption of data, for example, records that communication subsystem 112 may receive or token generation subsystem 114 may generate. Encryption subsystem 116 may include software components, hardware components, or a combination of both. For example, in some embodiments, encryption subsystem 116 may receive a public key, based on a target address, and may also receive a plurality of records. Encryption subsystem 116 may utilize symmetric-key encryption algorithms, such as stream ciphers, substitution ciphers or block ciphers. For example, encryption subsystem 116 may satisfy the Advanced Encryption Standard (AES). Encryption subsystem 116 may utilize asymmetric key (or public key) encryption algorithms, such as elliptic curve cryptography (e.g., Elliptic Curve Digital Signature Algorithm (ECDSA) or Elliptic Curve Diffie-Hellman) or the Rivest-Shamir-Adleman (RSA) cryptosystem. Encryption subsystem 116 may, for example, use a public key to encrypt the plurality of records into an encrypted payload, or may sign transmissions or messages. Data from encryption subsystem 116, such as encrypted payloads, may be accessible to communication subsystem 112, token generation system 114, characteristic determination subsystem 120 and/or decryption sub system 118.

Decryption subsystem 118 may execute tasks relating to decryption of data, for example, encrypted payloads that communication subsystem 112, token generation subsystem 114, or encryption subsystem 116 may generate. Decryption subsystem 118 may include software components, hardware components, or a combination of both. For example, in some embodiments, decryption subsystem 118 may possess or receive a private key, related to a cryptography-based storage application, and may receive an encrypted payload. Decryption subsystem 118 may utilize symmetric-key encryption algorithms, such as stream ciphers, substitution ciphers or block ciphers; for example, decryption subsystem 118 may satisfy the AES. Decryption subsystem 118 may utilize asymmetric key (or public key) encryption algorithms, such as elliptic curve cryptography (e.g., ECDSA or Elliptic Curve Diffie-Hellman) or the RSA cryptosystem. Decryption subsystem 118 may, for example, use a private key to decrypt an encrypted payload into a plurality of records. Data from decryption subsystem 118, such as pluralities of records, may be accessible to communication subsystem 112, token generation system 114, or characteristic determination subsystem 120.

Characteristic determination subsystem 120 may execute tasks related to determining characteristics of data. For example, characteristic determination subsystem 120 may analyze a plurality of sets of item identifiers or item profiles for themes, criteria, or features that may teach one or more characteristics. As such, characteristic determination subsystem 120 may include software components (e.g., API calls), hardware components, or a combination of both. Characteristic determination subsystem 120 may, for example, receive thresholds, requirements, or criteria from communication subsystem 112 to aid in making characteristic determination. Characteristic determination subsystem 120 may, additionally or alternatively, interface with one or more machine learning models. In some embodiments, characteristic determination subsystem 120 may receive a plurality of sets of item identifiers from decryption subsystem 118, and may, in response, train one or more machine learning models, or make a prediction based on these inputs. Characteristic determination subsystem 120 may receive data from network 150, data node 104 or on-chain programs 108a-108n. Based on any predictions or characteristic determinations, characteristic determination subsystem 120 may transmit data to token generation subsystem 114, which may generate a token based on these results.

Figure 2:
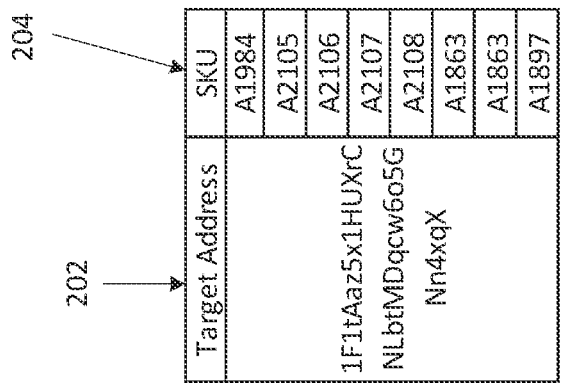
FIG. 2 shows an excerpt of a data structure for a blockchain operation request for generating cryptographic tokens based on received records, in accordance with one or more embodiments.

FIG. 2 shows a data structure 200 for a blockchain operation request for generating cryptographic tokens based on received records, in accordance with one or more embodiments. Data structure 200 may include fields 202 and 204. Data structure 200 may store or represent a blockchain operation request, which may include a plurality of records; network 150 may supply the corresponding blockchain operation request, through or independent of communication subsystem 112. Additionally, or alternatively, the blockchain operation request may originate in data node 104 or on-chain programs 108a-108n.

Field 204 may include any plurality of records. As referred to herein, records may include any data that is a collection of data items; these data items may be arranged for processing by a program, and may be contained in a file or a data set. For example, field 204 may include a set of item identifiers, wherein each record corresponds to an item identifier. In some embodiments, item identifiers may be stock-keeping unit (SKU) codes, as demonstrated in FIG. 2. Item identifiers may be associated with a particular entity, may be universal (e.g., International Article Numbers), or may include names, numbers, combinations of both, pictures, symbols, or any other identifier. By encapsulating sets of item identifiers, or any other records, in cryptographic tokens, the system may improve privacy and access to data, by enabling this potentially sensitive data to be controllable, accessible, and exclusive only to those in possession of the cryptographic keys required to access this data.

Field 202 may include a target address, which may be associated with a cryptography-based storage application. As referred to herein, a target address may include any identifier of a cryptography-based storage application that enables a user to transfer tokens or other items/data that are stored on a blockchain network. In some embodiments, a target address may be equivalent to a public key, or may be equivalent to one or more transformations of a public key (e.g., one or more hashes of a wallet's public key). A target address may be alphanumeric and may include an alphanumeric string between 10-50 characters long. Alphanumeric strings with different character length may be used as well. A target address may be set as a "controlling address," where token generation subsystem 114, encryption subsystem 116 or decryption subsystem 118 may set a particular target address as a controlling address for a cryptographic token (for example, an address associated with a cryptography-based storage application). As referred to herein, cryptography-based storage applications are any type of application, software or program that enables access to cryptographic resources, such as tokens. In some embodiments, a cryptography-based storage application may enable access to, for example, cryptocurrencies, security tokens and/or NFTs. In some embodiments, cryptography-based storage applications may have associated addresses, known as cryptography-based storage application addresses, which may include alphanumeric strings that are allocated on a blockchain network. In some embodiments, the cryptography-based storage application address may correspond to the cryptography-based storage application's public key. Furthermore, the cryptography-based storage application may store a private key. By utilizing cryptography-based storage applications and their related security features, cryptographic tokens may not only be stored securely, but they may also be transferred securely using, for example, asymmetric encryption, such as an elliptic curve digital signatures encryption algorithm. Thus, record tokenization system 102, for example, through encryption and decryption subsystems 116 and 118, respectively, may leverage the security features afforded by cryptography-based applications in order to secure a user's data, for example, a plurality of records, and enable the user to control access to such data through the use of cryptographic keys.

FIG. 3 shows an excerpt of a data structure for a generated cryptographic token. In some embodiments, token generation subsystem 114 may generate a token 300, such as an NFT, based on the blockchain operation request, with various fields. Field 303 associated with the token may include information about a creator of the token, which may include a cryptography-based storage application address (e.g., a wallet address), public key address, or another identifier of a creator of the token. Field 306 may store an address of an on-chain program that generated the token (e.g., the address of a smart contract, or a self-executing code, that generated the token) The address may correspond to a location of the on-chain program (e.g., the smart contract). Token ID field 309 may include an identifier of the generated token in relation to other tokens stored on the corresponding blockchain network.

In some embodiments, resource field 312 may include an encrypted payload itself, where encryption subsystem 116 may have generated the encrypted payload from a plurality of records or a set of item identifiers, for example. In some embodiments, resource field 312 may include a payload identifier that enables identification of the encrypted payload, which may be stored in an off-chain location; this payload identifier may include, for example, a uniform resource identifier (URI), which in turn may include a uniform resource name (URN) 315 and/or uniform resource locator (URL) 318. By enabling access to encrypted data through a cryptographic token, token generation subsystem 114 enables a user of a controlling address for the token to maintain ownership of the data. By encrypting the data and placing it in an off-chain location, the data may then be decrypted and re-encrypted to be accessible to another entity at the discretion of the user, thus enabling access to some entities while continuing to exclude access to others.

Token generation subsystem 114 may also utilize decryption subsystem 118 and characteristic determination subsystem 120 in such a way that token 300 contains an object or data related to one or more characteristics determined by characteristic determination system 120. These characteristic-related objects may include artwork or badges, which may be linked to token 300 through URI field 312. For example, a characteristic may include a designation relating to one or more thresholds, criteria, or requirements which, if satisfied, may lead to a determination of a characteristic. In some embodiments a plurality of records associated with a user may include sets of item identifiers that all correspond to energy-efficient items. Based on, for example, an energy efficiency metric associated with the sets of item identifiers, the characteristic determination system may determine that the sets of item identifiers correspond to the characteristic of "energy efficiency," which may be a characteristic applied to the corresponding user. Determining characteristics serves as a way to classify, identify, and handle users or corresponding data, which may serve to improve the efficiency of data collection and handling.

Figure 4:
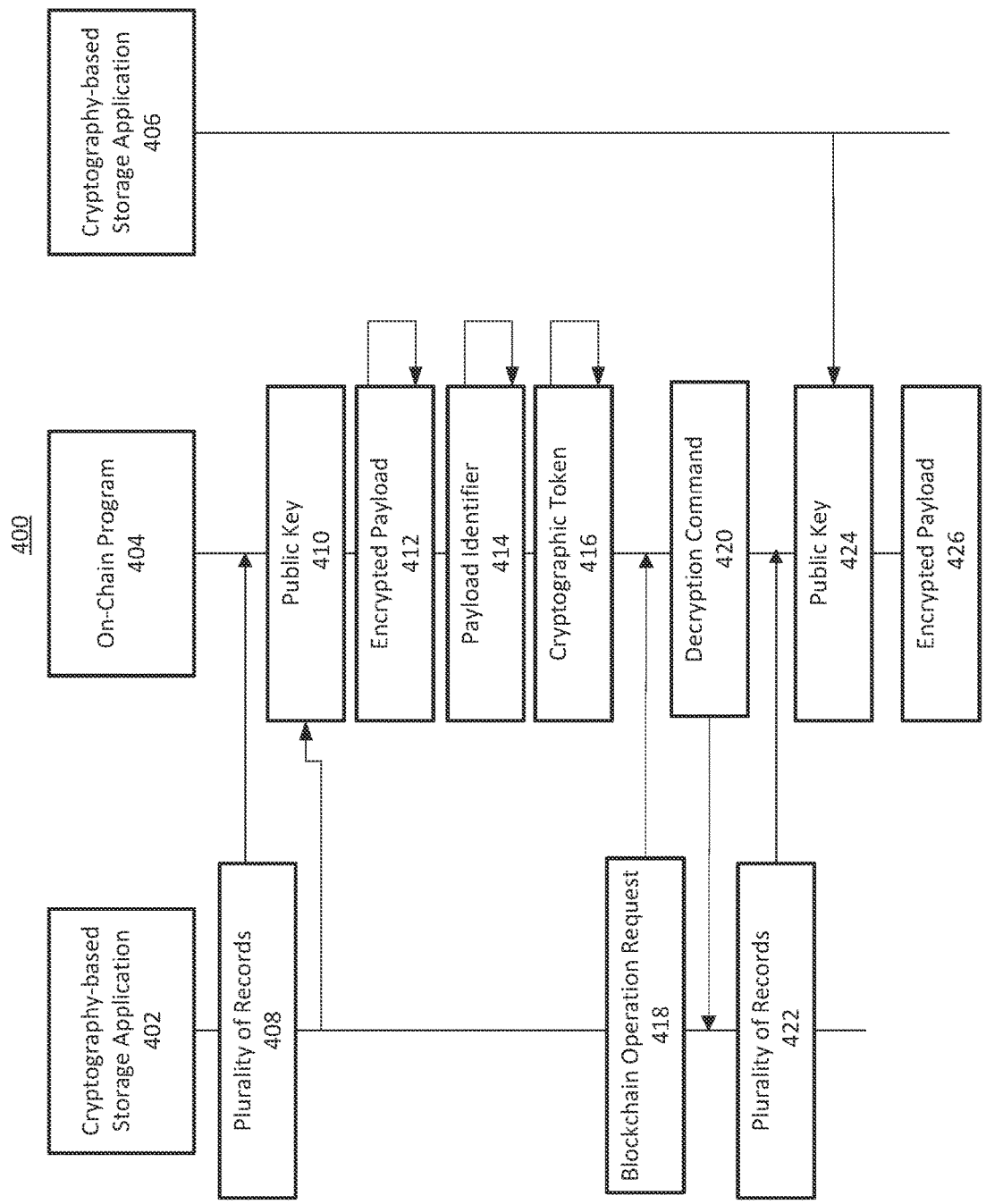
FIG. 4 illustrates a process for encrypting a plurality of records to generate a cryptographic token and providing access to another entity, in accordance with one or more embodiments.

FIG. 4 illustrates process 400 for encrypting a plurality of records to generate a cryptographic token and providing access to another entity, in accordance with one or more embodiments. In some embodiments, communication subsystem 112 may receive a blockchain operation request, which may include a plurality of records 408 and an associated cryptography-based storage application 402. The plurality of records may include items shown on a receipt that a user bought at a store or a website. The receipt may be scanned and/or sent to the system from the merchant or by the user (e.g., via a client device such as mobile phone, electronic tablet, etc.). The item identifiers (e.g., SKUs) may be extracted from the receipt or determined based on the listing within the receipt. The receipt may include other information (e.g., merchant identifier, day and time of the purchase, location, and/or other suitable information).

In some embodiments, the blockchain operation request may include a first target address associated with a cryptography-based storage application, and each record in plurality of records 408 may include an item identifier. For example, communication subsystem 112 may receive a first blockchain operation request from a computing device. The first blockchain operation request may include plurality of records 408 and a first target address associated with a first cryptography-based storage application, and wherein each record of the plurality of records includes an identifier of an item. For example, communication subsystem 112 may receive a target address (such as that depicted in field 202 in FIG. 2) along with a list of identifiers corresponding to items (e.g., SKUs, as depicted in field 204 in FIG. 2). By doing so, record tokenization system 102 enables a user to have precise control over which cryptography-based storage application may have access to the data. In some embodiments, this target address may be related to or equivalent to a cryptographic public key, which ensures that access to this data, once shared, is only enabled for those with the corresponding private key. As a result of this asymmetric encryption, these embodiments build a robust protection for any user records provided to record tokenization system 102.

In some embodiments, token generation subsystem 114 may utilize encryption subsystem 116 to encrypt plurality of records 408, such as a set of item identifiers (e.g., as in field 204), into encrypted payload 412 using a public key 410 associated with a target address in field 204. For example, token generation subsystem 114 may encrypt a data structure corresponding to receipt. The encrypted data may include an identifier of the user associated with the receipt. Encrypted payload 412 may include an encrypted form of data structure 200; for example, encryption subsystem 116 may use RSA encryption operations to encrypt the contents of fields 202 and 204 using a public key associated with a cryptography-based storage application in a way that preserves the columnar data structure. In some embodiments, encryption subsystem 116 may encrypt a part of or the whole of the data structure's tablespace. The result of this operation may be an encrypted payload, such as encrypted payload 412, which is under the control of cryptography-based storage application 402. An encrypted payload may include any data that is encrypted. For example, the data structure may include plurality of records 408 or a set of item identifiers that has been encrypted using a public key associated with a cryptography-based storage application of the user. By doing so, system 114 ensures that data is only accessible to any user with access to the cryptography-based storage application corresponding to the public key. Therefore, user data, once received, is protected in a way that prevents further misuse and dissemination against the user's will.

In some embodiments, encryption subsystem 114 may, before encrypting the plurality of records, determine public key 410 associated with the cryptography-based storage application. Record tokenization system 102 may determine, based on the first target address, a first public key associated with the first cryptography-based storage application, and may encrypt the plurality of records into a first encrypted payload using the first public key. For example, in order to determine the public key, communication subsystem 112 may send a request for the public key to the owner of the corresponding cryptography-based storage application based on the target address. In some embodiments, record tokenization system 102 may search through a database of public keys corresponding to target addresses and determine the public key accordingly. By determining the precise public key that corresponds to the cryptography-based storage application, record tokenization system 102 may ensure that the plurality of records is only accessible to the correct entity or entities.

In some embodiments, token generation subsystem 114 may generate cryptographic token 416 based on encrypted payload 412, as shown in FIG. 4. Record tokenization system 102 may generate, based on the encrypted payload, a cryptographic token, wherein the cryptographic token is controlled by the cryptography-based storage application, and wherein the cryptographic token enables access to the encrypted payload using the cryptography-based storage application. For example, token generation subsystem 114 may generate cryptographic token 416 including fields 303-318 shown in FIG. 3, which may include information such as an author (field 303), a smart contract address (field 306), and/or a token ID (field 309). The cryptographic token itself may contain the encrypted payload created in operation 804. By creating a cryptographic token, token generation subsystem 114 provides the encrypted information shared by a user with metadata, such as an author, a token ID, and a smart contract address, which then enables, for example, blockchain transactions.

In some embodiments, generating cryptographic token 416 may include setting a controlling address and encoding encrypted payload 412 into the cryptographic token. Generating, based on the encrypted load, the cryptographic token may include setting an address associated with the cryptography-based storage application as a controlling address for the cryptographic token and encoding the encrypted payload into the cryptographic token. The system may set a "target address" as this controlling address. For example, token generation subsystem 114 may generate cryptographic token 416 such that it is accessible by the address, and may encapsulate encrypted payload 412 in the token such that it is encrypted with public key 410 of the cryptography-based storage application. In effect, only those in possession of the corresponding private key may transfer the cryptographic token once committed to a blockchain. As a result, record tokenization system 102 may only give access to both the token and its contents to those who possess the private key corresponding to the public key and the cryptography-based storage application (i.e., the particular controlling address to which the cryptographic token is assigned).

In some embodiments, on-chain program 404 may store encrypted payload 412 in an off-chain location and determine payload identifier 414, where payload identifier 414 enables record tokenization system 102 to retrieve encrypted payload 412. Generating, based on the encrypted payload, the cryptographic token, may include generating a payload identifier associated with the cryptographic token, wherein the payload identifier enables retrieval of the encrypted payload, storing the encrypted payload in cloud storage in association with the payload identifier, and encoding the payload identifier into the cryptographic token. The on-chain program may store encrypted payload 412 in a cloud storage accessible via network 150, (e.g., at data node 104). For example, in order to generate the cryptographic token, token generation subsystem 114, through communication subsystem 112, may store the encrypted payload in cloud storage, such as AWS. Record tokenization system 102 may generate a link to this data in the form of, for example, a URL and/or a URN, as shown in FIG. 3 and token 300. This locator and/or name can then appear in the generated cryptographic token, allowing access to the encrypted payload through the cryptographic token itself. By doing so, record tokenization system 102 allows access to the token (e.g., through a blockchain network), while requiring a private key to access the encrypted payload itself. Subsequently, access to the payload is modifiable, without requiring the generation of a new cryptographic token as a whole. The encrypted payload may be decrypted and re-encrypted with another public key, while the payload identifier may stay the same. This operation means the metadata corresponding to the original cryptographic token may be preserved, even if permissions to the payload are modified.

Cryptographic token 416 may then include payload identifier 414, as illustrated in cryptographic token fields of FIG. 3 for token 300, which in turn enables access to encrypted payload 412. By storing encrypted payload 412 in another, off-chain location, record tokenization system 102 enables a user to subsequently control and reassign access to encrypted payload 412 and associated plurality of records 408. In some embodiments, token generation subsystem 114 may, instead of generating a new cryptographic token, determine that a user already has an associated cryptographic token with a URI pointing to an encrypted set of items (e.g., a set of receipts) corresponding to products that the user has bought. Thus, token generation subsystem 114 may process and encrypt a new receipt as described above and then transmit the encrypted payload associated with the receipt to the location of the other receipts, for example, through communication subsystem 112 and network 150. In these embodiments, token generation subsystem 114 may avoid generating multiple cryptographic tokens for one user and thus enable the user to control the user's data under one cryptographic token (e.g., under a single NFT). In some embodiments, token generation subsystem 114 may generate multiple tokens for the user. For example, each merchant may have a corresponding cryptographic token associated with the user and each merchant or token generation subsystem 114 may add items the user bought (e.g., via uploaded receipts) to be controlled by that cryptographic token.

Token generation subsystem 114 may cause cryptographic token 416 to be committed to a blockchain, such as a blockchain associated with on-chain program 404. For example, record tokenization system 102 may cause the cryptographic token to be committed to a blockchain and enable a user associated with the cryptography-based storage application to provide access to the plurality of records. For example, record tokenization system 102 may submit the cryptographic token to a pool corresponding to a specific blockchain network (e.g., Ethereum). As an example, the blockchain network may be proof-of-work, where a miner may solve a cryptographic problem in order to add the cryptographic token to a blockchain (e.g., blockchain 608). The cryptographic token may be added to the blockchain if a majority of nodes validate this addition. By committing the token to a blockchain network, token generation subsystem 114 may ensure that the creation of the cryptographic token, corresponding to the plurality of records, is validated and secure. Transferring this data requires cryptographic access to the token (e.g., via public/private keys), which ensures that the data is available only to those with this access. However, committing the information to a blockchain network also allows for other parties sharing this information with other parties with access to the blockchain network.

In some embodiments, enabling the user to provide access to the plurality of records may include receiving a second request to transfer control of the token. Enabling the user associated with the cryptography-based storage application to provide access to the plurality of records may include receiving a second blockchain operation request to transfer control of the cryptographic token to a second cryptography-based storage application. For example, communication subsystem 112 may receive a request for the token from another device associated with another cryptography-based storage application in computer network 150. By accepting these requests, record tokenization system 102 may accommodate requests to share a user's data with other parties. For example, in some embodiments, a first cryptography-based storage application 402 may transmit a second blockchain operation request 418 for assigning control of cryptographic token 416, where control is assigned to cryptography-based storage application 406. For example, the user may desire to give control of the user's cryptographic token (e.g., NFT) to an entity that may recommend products for the user based on the user's shopping preferences. On-chain program 404 may then transmit decryption command 420 to a device associated with cryptography-based storage application 402 that may use a key (e.g., a private key) to decrypt encrypted payload 412 associated with payload identifier 414 of cryptographic token 416. On-chain program 404 may then encrypt plurality of records 422 using public key 424 associated with cryptography-based storage application 406, and replace the encrypted payload at the location corresponding to payload identifier 414 with the new encrypted payload. Although on-chain program 404 may encrypt the data using the public cryptography-based storage application, the cryptographic token is still controlled by the user's cryptography-based storage application. Accordingly, the user maintains control of the data and may reassign the data to another entity or to himself/herself using a similar process. Furthermore, record tokenization system 102 enables a user, for example, one associated with cryptography-based storage application 402, to consent to providing data to another entity, such as one controlling cryptography-based storage application 406 and enables the user to transfer the data by decrypting and re-encrypting the data for the new entity.

In some embodiments, replacing encrypted payload 412 with new encrypted payload 426 may include retrieving payload identifier 414, determining a location associated with the payload, and replacing original encrypted payload 412 with the new one at this location. Replacing the encrypted payload with the new encrypted payload may include retrieving the payload identifier, determining, based on the payload identifier, a location associated with the encrypted payload, and replacing, in the location associated with the encrypted payload, the encrypted payload with the new encrypted payload. Here, replacing the encrypted payload with a new encrypted payload associated with cryptography-based storage application 406 may involve identifying the payload identifier in which the encrypted payload is stored, and replacing the payload at the location where this may occur. For example, based on the payload identifier (e.g., a URI), record tokenization system 102 may determine a URL where the encrypted payload may sit, and replace the payload at this location. Thus, the process enables possession of the plurality of records to transfer from one cryptography-based storage application to another, by changing the encryption on the encrypted payload, while the encrypted payload remains in the same virtual location. In doing so, the original user has control over who has access to this data, as communication subsystem 112 may need to request decryption from the user in order to share the contents of the payload with other entities.

In some embodiments, communication subsystem 112 may further receive a second request with a second plurality of records, determine that the request is from the first cryptography-based storage application (e.g., cryptography-based storage application 402), encrypt the records into another encrypted payload, and store the encrypted payload in cloud-based storage. That is, record tokenization system 102 may receive a second blockchain operation request including a second plurality of records, determine, based on a blockchain identifier associated with the second blockchain operation request, that the second blockchain operation request is associated with the cryptography-based storage application, encrypt the second plurality of records into a second encrypted payload using the public key associated with the cryptography-based storage application, and store the second encrypted payload in a cloud-based storage, wherein the second encrypted payload is accessed using the cryptography-based storage application using the cryptographic token. For example, a user associated with the original cryptography-based application may decide to add a plurality of records, such as a set of item identifiers, to the set of data that the cryptographic token encapsulates. Record tokenization system 102 may then encrypt this data using the corresponding public key, having confirmed that the request to add this data originated from the same user. Communication subsystem 112 may then store this data in cloud storage that is associated with the cryptographic token. Thus, record tokenization system 102 allows a user's data to be controlled (e.g., more data added) via the cryptographic token, enabling modularity and flexibility for the user in terms of which data is represented by the token.

In some embodiments, token generation subsystem 114 may further add a second payload identifier related to a second encrypted payload to the cryptographic token, receive a request to access entries associated with the token, retrieve payload identifiers, and retrieve both first and second encrypted payloads. Token generation subsystem 114 may add a second payload identifier associated with the second encrypted payload to the cryptographic token, receive a request to access entries associated with the cryptographic token, retrieve a first payload identifier associated with the plurality of records and the second payload identifier, and retrieve the encrypted payload and the second encrypted payload. For example, a second encrypted payload corresponding to the second plurality of records may be stored in another location, associated with a second payload identifier; this payload identifier may be, for example, a URI pointing to cloud storage (e.g., a URL or a URN pointing to storage on AWS). Token generation subsystem 114 may then add this second payload identifier to cryptographic token 416. Communication subsystem 112 may then read or retrieve all payloads associated with all payload identifiers related to the cryptographic tokens. By doing so, cryptographic token 416 allows access to all data associated with itself. The use of payload identifiers enables this flexibility in where and what is stored within a cryptographic token.

Figure 5:
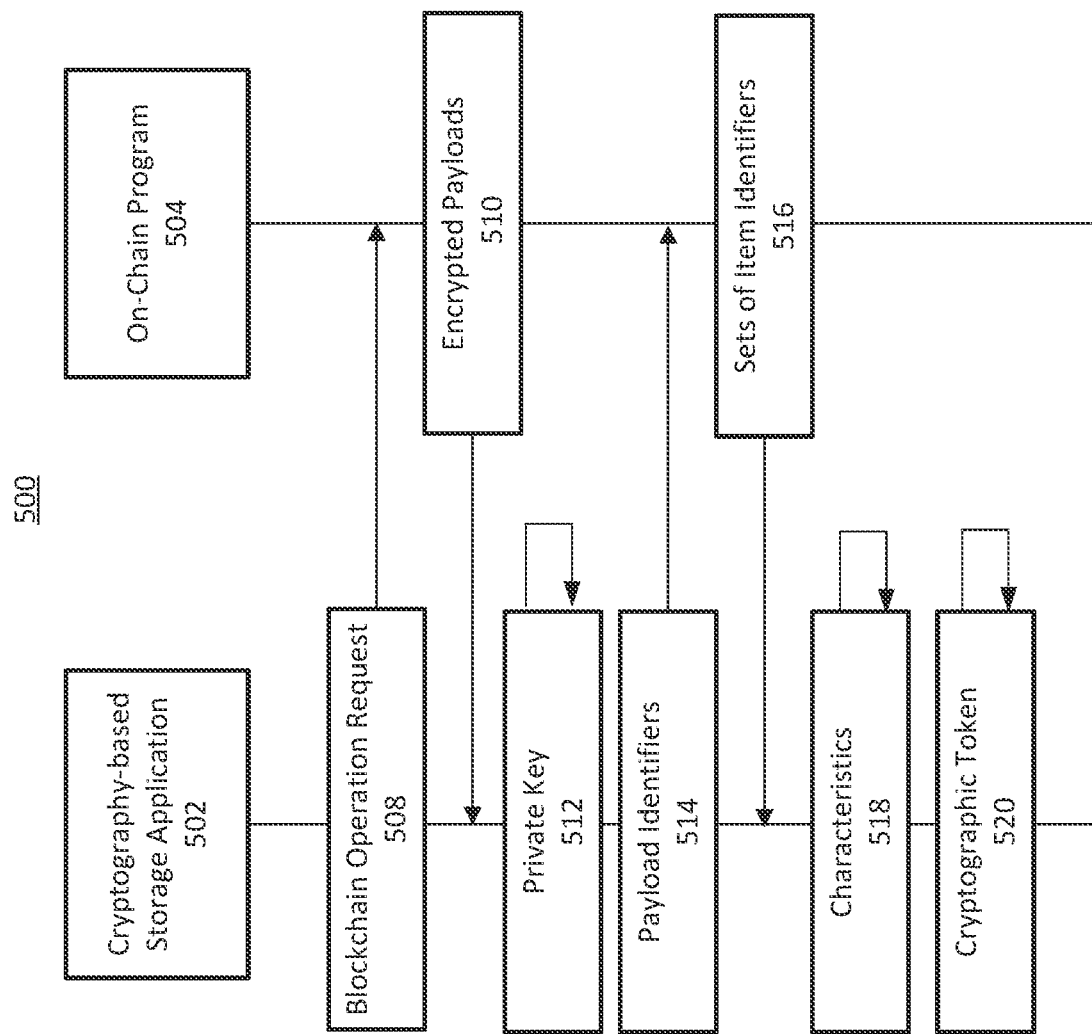
FIG. 5 illustrates a process for generating a cryptographic token based on characteristics of a previously generated cryptographic token, in accordance with one or more embodiments.

FIG. 5 illustrates process 500 for generating a cryptographic token based on characteristics of a previously generated cryptographic token, in accordance with one or more embodiments. That is, cryptography-based storage application 502 may generate and transmit, to a blockchain node associated with a blockchain, a blockchain operation request for a plurality of encrypted payloads, wherein the blockchain operation request includes one or more identifiers of one or more cryptographic tokens. For example, cryptography-based storage application 502 may provide token IDs, as depicted in field 309, related to a cryptographic token. This token or token ID may be associated with a particular user. Cryptography-based storage application 502 may send these token IDs to a blockchain node in the form of blockchain operation request 508. By doing so, an external entity may request data about another user's item identifiers, for example. As the cryptographic tokens containing these data are in a blockchain network, this user data is easily accessible by another party, though it is still protected as it is in an encrypted form, and may require further permission and decryption from the user.

In some embodiments, blockchain operation request 508 may be sent from cryptography-based storage application 502 to and executed on on-chain program 504. Cryptography-based storage application 502 may generate a blockchain operation request to be executed by an on-chain program, wherein the blockchain operation request includes one or more identifiers of the one or more cryptographic tokens and a program identifier of the on-chain program and transmit the blockchain operation request to a blockchain node associated with the on-chain program. For example, cryptography-based storage application 502 may specify a program identifier, such as a smart contract address as in field 306, for a particular smart contract or self-executing code, for the blockchain operation request. The cryptographic token identifier may take a form as shown in field 309, such as a token ID. By specifying the exact tokens that are requested, and by transmitting the request to the on-chain program that handles these tokens, the request may be sufficiently precise for specifying the particular user, or corresponding cryptographic token, and data that is to be retrieved.

On-chain program 504 may then transmit encrypted payloads 510 to cryptography-based storage application 502. The cryptography-based storage application may receive, from the blockchain node in response to the blockchain operation request, the plurality of encrypted payloads associated with the one or more cryptographic tokens, wherein the plurality of encrypted payloads has been encrypted using a first key associated with a cryptography-based storage application. For example, cryptography-based storage application 502 may receive encrypted payloads that have been stored in a cryptographic token, such as an NFT. These encrypted payloads may include lists of item identifiers, for example SKUs as in field 204, that are encrypted using a cryptography-based storage application's public key, for example, through ECDSA public key encryption. This public key may be related to or equivalent to the cryptography-based storage application's address. By receiving encrypted payloads 510, the blockchain node may provide encrypted user data associated with the user of the cryptography-based storage application, for example through on-chain program 504; however, this information is not immediately accessible without decryption, and is therefore still secure.

Decryption subsystem 118 may decrypt encrypted payloads 510 to determine a set of payload identifiers 512 using, for example, private key 512 associated with cryptography-based storage application 502. Decryption subsystem 118 may decrypt, using a second key associated with the cryptography-based storage application, plurality of encrypted payloads 510 into plurality of payload identifiers 514. In some embodiments, decrypting the encrypted payloads may involve using a private key. Decryption subsystem 118 may decrypt, using a private key associated with the cryptography-based storage application, the plurality of encrypted payloads into a plurality of payload identifiers. For example, record tokenization system 102 may have access to a second key, such as a private key associated with the cryptography-based storage application through an ECDSA. Decryption subsystem 118 may then use this private key to decrypt the encrypted payloads that were initially encrypted with the corresponding public key. By doing so, record tokenization system 102 may enable access to the user's records, which in some embodiments may be associated with payload identifiers that identify the location of the user's data through, for example, a URL, as in field 312. Thus, by decrypting these records, the system may provide access to the user's data. However, as the decryption requires access to a second key, this access is contingent on surmounting this cryptographic barrier.

In some embodiments, decrypting plurality of encrypted payloads 510 may include transmitting a command to another device and receiving the decrypted payload in response. Decrypting the plurality of encrypted payloads into the plurality of payload identifiers may include transmitting, to a user device associated with the cryptography-based storage application, a command to decrypt the plurality of payload identifiers, wherein the command includes the plurality of payload identifiers and an application identifier associated with the cryptography-based storage application and receiving, from the user device, the plurality of payload identifiers, wherein the user device decrypts the plurality of encrypted payloads into the plurality of payload identifiers using the second key associated with the cryptography-based storage application. For example, decryption subsystem 118 itself may not possess private key 512, or second key, required to decrypt the encrypted payloads. Therefore, communication subsystem 112 may transmit a request to a user device, for example, one that is associated with the cryptography-based storage application, in order to have the user decrypt the payloads. The user may then use private key 512, for example, to decrypt the encrypted payload and may send the communication subsystem to the payload identifiers, such as URLs, associated with the cryptographic token(s). In this way, the user that possesses or controls the cryptographic tokens may retain control of the data and may only share this data with those with their consent.

In some embodiments, decrypting the encrypted payloads 510 into the payload identifiers 514 may involve retrieving a second key and carrying out this decryption using this key. Decrypting the plurality of encrypted payloads into the plurality of payload identifiers may include retrieving, based on an application identifier associated with the cryptography-based storage application, the second key associated with the cryptography-based storage application and decrypting the plurality of encrypted payloads into the plurality of payload identifiers using the second key associated with the cryptography-based storage application. For example, record tokenization system 102 may search through a database of cryptography-based storage applications for the particular cryptography-based storage application whose data is desired. Based on this search, record tokenization system 102 may retrieve a second key, for example, private key 512, that is associated with cryptography-based storage application 502. Using this private key, the decrypted payload identifiers may be revealed without requiring another user to decrypt this data separately. In this case, record tokenization system 102 may already possess the cryptographic keys required to decrypt the encrypted payloads but must determine precisely which key(s) to use. For example, record tokenization system 102 may already possess the cryptographic tokens, for example. By doing so, record tokenization system 102 may be able to determine the payload identifiers that are associated with a particular set of cryptographic tokens or users.

In some embodiments, decrypting encrypted payloads 510 into the payload identifiers 514 may involve retrieving a second key and carrying out this decryption using this key. Decrypting the plurality of encrypted payloads into the plurality of payload identifiers may include retrieving, based on an application identifier associated with the cryptography-based storage application, the second key associated with the cryptography-based storage application and decrypting the plurality of encrypted payloads into the plurality of payload identifiers using the second key associated with the cryptography-based storage application. For example, record tokenization system 102 may search through a database of cryptography-based storage applications for the particular cryptography-based storage application whose data is desired. Based on this search, record tokenization system 102 may retrieve a second key, for example, a private key, that is associated with this cryptography-based storage application. Using this private key, the decrypted payload identifiers may be revealed without requiring another user to decrypt this data separately. In this case, record tokenization system 102 may already possess the cryptographic keys required to decrypt the encrypted payloads but must determine precisely which key(s) to use. This may be the case if record tokenization system 102 already possesses a cryptographic token associated with blockchain operation request 508, for example. By doing so, record tokenization system 102 may be able to determine the payload identifiers that are associated with a particular set of cryptographic tokens or users.

By determining these payload identifiers, record tokenization system 102 may retrieve sets of item identifiers 516, and determine one or more characteristics 518 associated with these sets of items, in turn associated with sets of item identifiers 516. Record tokenization system 102 may retrieve, based on the plurality of payload identifiers, the plurality of sets of item identifiers, and retrieving these sets of item identifiers may include extracting, from the plurality of payload identifiers, a plurality of URIs, and retrieving the plurality of sets of item identifiers using the plurality of URIs. For example, record tokenization system 102 may determine or extract URIs based on payload identifiers 514 (e.g., field 312), which may contain a URN (e.g., field 315) and a URL (e.g., field 318). By following the URLs, record tokenization system 102 may be able to retrieve the data associated with the corresponding payload identifiers; this data may include many sets of item identifiers, such as many lists of SKUs as in field 204. By retrieving this data from the payload identifiers, characteristic determination subsystem 120 may access the data that a user initially shared, and may subsequently process this data, for example to determine characteristics for the user.

In some embodiments, communication subsystem 112 may transmit a retrieval request for the payload identifiers 514 and subsequently receive sets of item identifiers 516. Communication subsystem 112 may transmit one or more blockchain retrieval requests for the plurality of payload identifiers, wherein the one or more blockchain retrieval requests cause a plurality of sets of item identifiers to be retrieved. In some embodiments, communication subsystem 112 may transmit, to the blockchain node, a command to retrieve the plurality of sets of item identifiers, wherein the command includes the plurality of payload identifiers and an application identifier of an on-chain program used to commit the one or more cryptographic tokens to the blockchain and may receive, from the blockchain node, the plurality of sets of item identifiers, wherein the blockchain node executes the on-chain program to retrieve the plurality of sets of item identifiers from a remote location. For example, communication subsystem 112 may retrieve a list of payload identifiers, such as URLs, and submit a request to another system, computer, or program to retrieve the contents of these URLs. The request may be directed to a particular application identifier of on-chain program 504 (e.g., a smart contract address as in field 306). These operations may be necessary if record tokenization system 102 itself does not have access to the locations corresponding to the URLs, for instance.

Characteristic determination subsystem 120 may determine characteristics 518 associated with the sets of items. Subsystem 120 may determine one or more characteristics associated with a plurality of sets of items corresponding to the plurality of sets of item identifiers. For example, using the information from sets of item identifiers 516, such as SKU codes, characteristic determination subsystem 102 may determine a set of qualitative or quantitative characteristics 518 associated with the sets of items and, in some embodiments, related to the particular user of the cryptography-based storage application. Characteristic subsystem 102 may deduce these characteristics by implementing thresholds, criteria, or requirements for a given characteristic. For example, a memory-efficient user may possess a list of memory-efficient software programs, wherein each memory-efficient software program satisfies a particular maximum threshold for memory footprint. Thus, by doing so, record tokenization system 102 may deduce characteristics 518 associated with a particular user.

In some embodiments, determining characteristics 518 may include retrieving corresponding item profiles and determining these characteristics based on characteristics within each item profile. For example, determining the one or more characteristics associated with the plurality of sets of items corresponding to the plurality of sets of item identifiers 516 may include retrieving, using the plurality of sets of item identifiers, a corresponding item profile, wherein each item profile includes a plurality of characteristics associated with each item, and determining the one or more characteristics associated with the plurality of sets of items based on characteristics within each item profile. For example, communication subsystem 112 may retrieve, from a database of SKUs, a list of characteristics associated with each item. For example, a software program may have a "memory required" characteristic, a "disk space required" characteristic and a "type of software" field. Communication subsystem 112 may retrieve these fields from a database and make a determination as to whether enough of the items satisfy a criteria. For example, if the items correspond to software programs, characteristic determination subsystem 120 may determine that all programs lie within a threshold "memory required" value, and may, in response, designate the user a characteristic of "memory-efficient." However, subsystem 120 may determine that the programs all require a disk space higher than a particular threshold and, in response, may not designate the user as "disk space-efficient." These designations may also be made using a machine learning program, which may receive, as input, item identifiers related to a particular user and may determine, as an output, one or many characteristics that the users satisfy. By first retrieving these characteristics related to each item, record tokenization system 102 may then characterize the items associated with a particular user, cryptography-based storage application, or cryptographic token and may then determine corresponding characteristics 518.

Token generation subsystem 114 may then generate a new cryptographic token, for example, cryptographic token 520, based on characteristics 518. That is, token generation subsystem 114 may generate a new cryptographic token to be controlled by the cryptography-based storage application, wherein the new cryptographic token indicates the one or more characteristics. For example, based on determining that a particular user is "memory-efficient," based on associated sets of item identifiers, characteristic determination subsystem 120 may create a piece of digital artwork related to this designation. Token generation subsystem 114 may then generate cryptographic token 520, such as an NFT, directed towards this artwork, and provide access of the token to the cryptography-based storage application for which record tokenization system 102 designated the particular characteristics. For example, record tokenization system 102 may accomplish this by encrypting the digital artwork using a public key associated with the cryptography-based storage application and/or private key 512. By doing so, record tokenization system 102 may produce analyses of a user's data, which a user may have provided with consent, and may return the results of the analysis to the user in a secure fashion that may only be accessible to the particular user.

Figure 6:
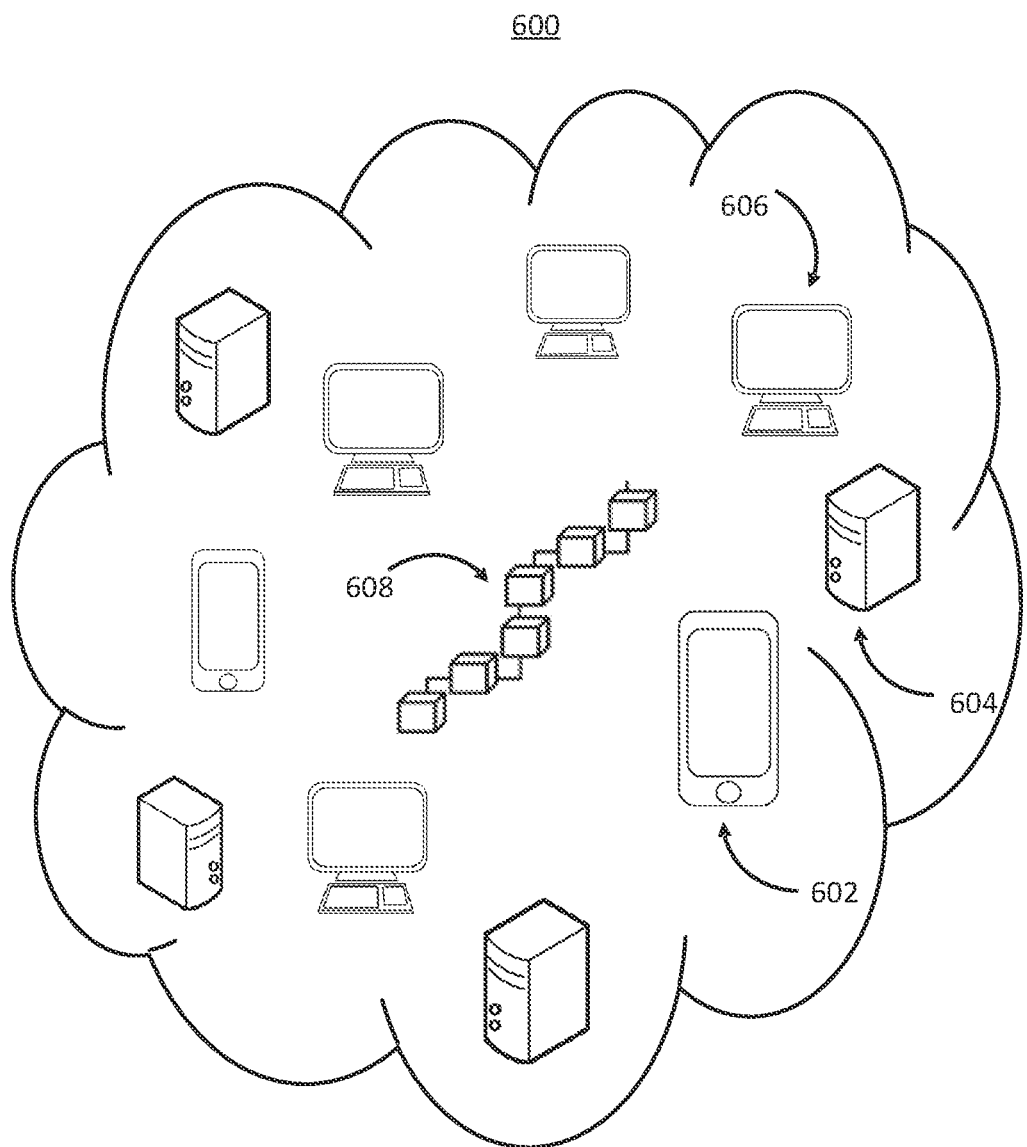
FIG. 6 shows illustrative components for a system interacting with a blockchain network, in accordance with one or more embodiments.

FIG. 6 shows an illustrative diagram for a decentralized environment for performing blockchain functions, in accordance with one or more embodiments. For example, the diagram presents various components that may be used to generate tokens based on received records, or for using encrypted blockchain-based data to determine user characteristics and generate corresponding cryptographic tokens, in some embodiments.

As shown in FIG. 6, system 600 may include multiple user devices (e.g., user device 602, user device 602, and/or user device 606). For example, system 600 may include a distributed state machine, in which each of the components in FIG. 6 acts as a client of system 600. For example, system 600 (as well as other systems described herein) may include a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 600 may interact with, and facilitate the function of, blockchain 608.

It should be noted that, while shown as a smartphone, a personal computer, and a server in FIG. 6, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 600 performing a blockchain function may equally be applied to, and correspond to, an individual user device (e.g., user device 602, user device 608, and/or user device 610) performing the blockchain operation. That is, system 600 may correspond to the user devices (e.g., user device 602, user device 604, and/or user device 606) collectively or individually.

Each of the user devices may be used by the system to conduct blockchain functions sometimes referred to as blockchain operations and/or contribute to generating tokens based on received records, or for using encrypted blockchain-based data to determine user characteristics and generate corresponding cryptographic tokens, in some embodiments. As referred to herein, "blockchain operations" may include any operations including and/or related to blockchains and blockchain technology. For example, blockchain operations may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain operation may include the creation, modification, detection, and/or execution of a smart contract or an on-chain program (e.g., a program stored on a blockchain). For example, a smart contract may include a program stored on a blockchain that is executed (e.g., automatically, without any intermediary's involvement or time loss) when one or more predetermined conditions are met. In some embodiments, a blockchain operation may include the creation, modification, exchange, and/or review of a token (e.g., a digital blockchain-specific asset), including an NFT. An NFT that is sometimes referred to as a cryptographic token may include a token that is associated with a good, a service, a smart contract, and/or other content that may be verified by, and stored using, blockchain technology.

In some embodiments, blockchain functions may also include actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas includes a mechanism for enabling Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 6, one or more user devices may include a cryptography-based storage application (e.g., digital wallet 604) used to perform blockchain functions. For example, the digital wallet may include a repository that enables users to store, manage, and trade their cryptocurrencies and other cryptographic tokens (e.g., NFTs), interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 6, one or more user devices may include a private key (e.g., key 612) and/or digital signature. For example, system 600 may use cryptographic systems for conducting blockchain functions, such as generating tokens based on received records, or for using encrypted blockchain-based data to determine user characteristics and generate corresponding cryptographic tokens, in some embodiments. For example, system 600 may use public key cryptography, which features a pair of digital keys (e.g., which may include strings of data). In such cases, each pair includes a public key (e.g., which may be public) and a private key (e.g., which may be kept private). System 600 may generate the key pairs using cryptographic algorithms (e.g., featuring one-way functions). System 600 may then encrypt a message (or other blockchain function) using an intended receiver's public key such that the encrypted message may be decrypted only with the receiver's corresponding private key. In some embodiments, system 600 may combine a message with a private key to create a digital signature on the message. For example, the digital signature may be used to verify the authenticity of blockchain functions. As an illustration, when conducting blockchain functions, system 600 may use the digital signature to prove to every node in the system that it is authorized to conduct the blockchain functions.

For example, system 600 may include a plurality of nodes for the blockchain network. Each node may correspond to a user device (e.g., user device 602). A node for a blockchain network may include an application or other software that records and/or monitors peer connections to other nodes and/or miners for the blockchain network. For example, a miner includes a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 602 may request a blockchain function (e.g., conduct a transaction). The blockchain function may be authenticated by user device 604 and/or another node (e.g., a user device in the community network of system 600). For example, using cryptographic keys, system 600 may identify users and give access to their respective user accounts (e.g., corresponding digital wallets) within system 600. Using private keys (e.g., known only to the respective users) and public keys (e.g., known to the community network), system 600 may create digital signatures to authenticate the users.

Following an authentication of the blockchain function, the blockchain function may be authorized. For example, after the blockchain function is authenticated between the users, system 600 may authorize the blockchain function prior to adding it to the blockchain. System 600 may add the blockchain function to blockchain 608. System 600 may perform this based on a consensus of the user devices within system 600. For example, system 600 may rely on a majority (or other metric) of the nodes in the community network (e.g., user device 602, user device 604, and/or user device 606) to determine that the blockchain function is valid. In response to validation of the block, a node user device (e.g., user device 602, user device 604, and/or user device 606) in the community network (e.g., a miner) may receive a reward (e.g., in a given cryptocurrency) as an incentive for validating the block.

To validate the blockchain function, system 600 may use one or more validation protocols and/or validation (or consensus) mechanisms. For example, system 600 may use a POW mechanism in which a user device must provide evidence that it performed computational work to validate a blockchain function and thus this mechanism provides a manner for achieving consensus in a decentralized manner, as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 600 may use a POS mechanism in which a user account (e.g., corresponding to a node on the blockchain network) is required to have, or "stake," a predetermined amount of tokens in order for system 600 to recognize it as a validator in the blockchain network.

In response to validation of the block, the block is added to blockchain 608, and the blockchain function is completed. For example, to add the blockchain function to blockchain 608, the successful node (e.g., the successful miner) encapsulates the blockchain function in a new block before transmitting the block throughout system 600.

Figure 7:
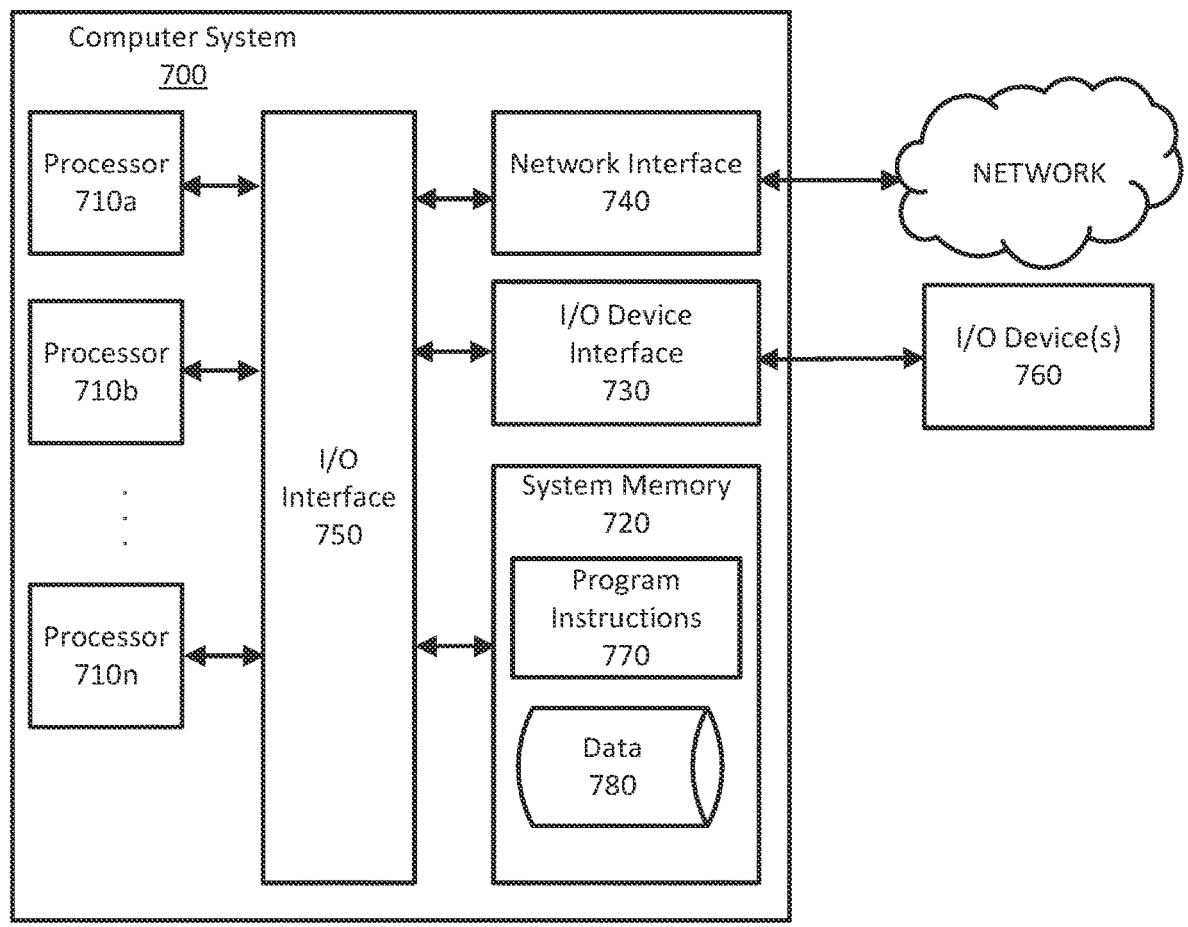
FIG. 7 illustrates a computing device, in accordance with one or more embodiments of this disclosure.

FIG. 7 shows an example computing system that may be used in accordance with some embodiments of this disclosure. In some instances, computing system 700 is referred to as a computer system 700. A person skilled in the art would understand that those terms may be used interchangeably. The components of FIG. 7 may be used to perform some or all operations discussed in relation to FIGS. 1-5. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an I/O interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory, computer-readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 8:
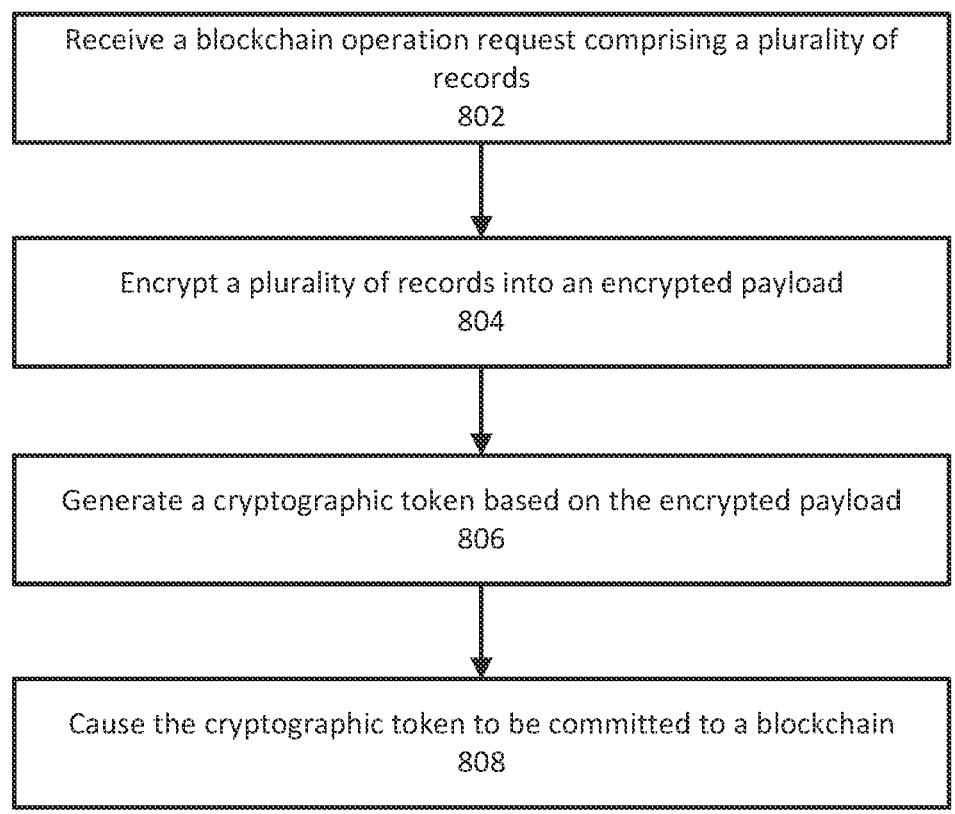
FIG. 8 shows a flowchart of operations for generating a cryptographic token based on received records, in accordance with one or more embodiments.

FIG. 8 shows a flowchart of the basic operations involved in generating cryptographic tokens based on received records. For example, the system may use process 400 (e.g., as implemented on one or more system components described above) in order to receive a plurality of records, which may contain item identifiers, and generate tokens to allow access to these records.

At 802, process 800 (e.g., using one or more components described above) may enable computer system 700 to receive a blockchain operation request comprising a plurality of records. For example, communication subsystem 112, through network interface 740, may receive a blockchain operation request including a plurality of records 408. Each record of the plurality of records may include an identifier of an item. In addition, the blockchain operation request may be associated with a cryptography-based storage application. Record tokenization system 102 may receive a request from, for example, a network 150 through network interface 740 to a communication subsystem 112, and the request may include data structure 200 as illustrated in FIG. 2. Computer system 700 may receive, for example, a list of identifiers corresponding to items, such as SKUs, as well as a request to associate them with a cryptography-based storage application. Computer system 700 may subsequently store this data in system memory 720, for example, as data 780, by interfacing through I/O interface 750.

At 804, process 800 (e.g., using one or more components described above) may enable computer system 700 to encrypt plurality of records 408, which may be stored as data 780, into encrypted payload 412 (e.g., using encryption subsystem 116). For example, computer system 700 may encrypt the plurality of records into an encrypted payload using a public key associated with the cryptography-based storage application. The system may, as an example, encrypt a list of item identifiers into an encrypted payload, by applying a cryptographic algorithm, such as an ECDSA to the alphanumeric text string corresponding to the item identifiers by using one or more of processors 710a-710n and program instructions 770. Computer system 700 may subsequently store encrypted payload 412 in data 720 associated with system memory 720.

At 806, process 800 (e.g., using one or more components described above) may enable token generation subsystem 114 to generate cryptographic token 416 based on encrypted payload 412. Computer system 700 may generate, based on the encrypted payload, a cryptographic token, wherein the cryptographic token is controlled by the cryptography-based storage application, and wherein the cryptographic token enables access to the encrypted payload using the cryptography-based storage application. For example, token generation subsystem 114 may send program instructions 770 to one or many of processors 710a-710n to generate cryptographic token 416, including fields 303-318 shown in FIG. 3, and may include information such as an author (field 303), a smart contract address (field 306), and/or a token ID (field 309). The cryptographic token itself may contain the encrypted payload created in operation 804, or a URI linked to the payload. Computer system 700 may store the contents of cryptographic token 416, such as those depicted in token 300, in data 780 within system memory 720.

At 808, process 800 (e.g., using one or more components described above) may enable the system to cause cryptographic token 416 to be committed to a blockchain. The system may cause the cryptographic token to be committed to a blockchain and enable a user associated with the cryptography-based storage application to provide access to the plurality of records. For example, the computer system 700 may utilize network interface 740 to submit cryptographic token 416 to a pool in network 150 corresponding to a specific blockchain network (e.g., Ethereum), such as that depicted in network 600. As an example, the blockchain network may be proof-of-work, where miners, such as those at devices 604 or 606, may solve a cryptographic problem in order to validate the addition of the cryptographic token to a blockchain (e.g., blockchain 608). The cryptographic token may be added to the blockchain if a majority of nodes validate the problem.

Figure 9:
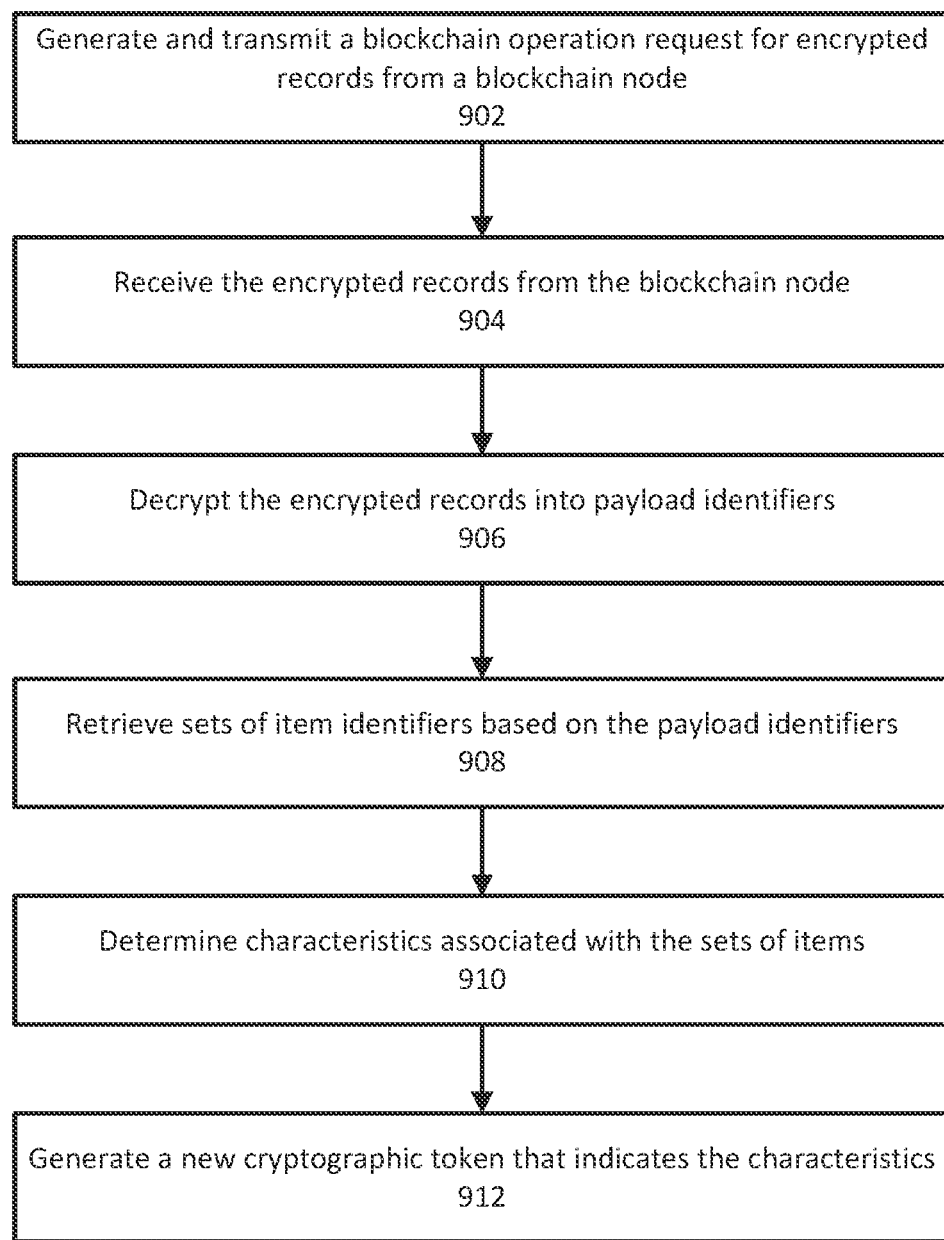
FIG. 9 shows a flowchart of operations for using encrypted blockchain-based data to determine user characteristics and generate corresponding cryptographic tokens, in accordance with one or more embodiments.

FIG. 9 shows a flowchart of the operations involved in using encrypted blockchain-based data to determine user characteristics and generate corresponding cryptographic tokens, in accordance with one or more embodiments. For example, the system may use process 400 (e.g., as implemented on one or more system components described above) in order to receive sets of records related to a cryptography-based storage application, determine user characteristics based on these records, and generate corresponding cryptographic tokens.

At 902, process 900 (e.g., using one or more components described above) enables computer system 700 to generate and transmit a blockchain operation request for encrypted records from a blockchain node, for example, through token generation subsystem 114. That is, communication subsystem 112 may generate and transmit, to a blockchain node associated with a blockchain, a blockchain operation request for a plurality of encrypted payloads, wherein the blockchain operation request includes one or more identifiers of one or more cryptographic tokens. For example, communication subsystem 112 may utilize network interface 740 to provide token IDs (e.g., as in field 309) related to a cryptographic token, which may be associated with a user and stored in system memory 720 as data 780. Communication subsystem 112 may then send these token IDs to on-chain program 504 in the form of a request through network interface 740.

At 904, process 900 (e.g., using one or more components described above) enables computer system 700 to receive encrypted payloads 510 from on-chain program 504. Computer system 700 may receive, from the blockchain node in response to the blockchain operation request, the plurality of encrypted payloads associated with the one or more cryptographic tokens, wherein the plurality of encrypted payloads has been encrypted using a first key associated with a cryptography-based storage application. For example, network interface 740 may receive encrypted payloads 510 that have been stored in a cryptographic token, such as an NFT. These encrypted payloads may include lists of item identifiers, for example SKUs as in field 204, that are encrypted using a cryptography-based storage application's public key, which in turn may be related to the cryptography-based storage application's address. Computer system 700 may subsequently store these encrypted payloads as data 780 associated with system memory 720.

At 906, process 900 (e.g., using one or more components described above) enables computer system 700 to decrypt encrypted payloads 510 into payload identifiers 514. Decryption subsystem 118 may decrypt, using a second key associated with the cryptography-based storage application, the plurality of encrypted payloads into a plurality of payload identifiers. In some embodiments, decrypting the encrypted payloads may involve using private key 512. Program instructions 770, for example, may be sent to one or more of processors 710a-710n to request decryption of the plurality of encrypted payloads into a plurality of payload identifiers. For example, the system may have access to a second key, such as a private key associated with the cryptography-based storage application through an ECDSA. One or many of processors 710a-710n may then use this private key to decrypt the encrypted payloads that were initially encrypted with the corresponding public key. The results of the encrypted payloads, such as sets of payload identifiers 514, may reside in system memory 720 as data 780.

At 908, process 900 (e.g., using one or more components described above) may enable computer system 700 to retrieve sets of item identifiers 516 based on payload identifiers 514. Communication subsystem 112, for example, may retrieve, based on the plurality of payload identifiers, a plurality of sets of items of identifiers. In some embodiments, computer system 700, through network interface 740, may extract URIs and subsequently retrieve sets of item identifiers 516. That is, computer system 700 may retrieve, based on the plurality of payload identifiers, the plurality of sets of item identifiers, and retrieving these sets of item identifiers may include extracting, from the plurality of payload identifiers, a plurality of URIs, and retrieving the plurality of sets of item identifiers using the plurality of URIs. For example, computer system 700 may determine or extract URIs based on the payload identifier (e.g., field 312), which may contain a URN (e.g., field 315) and a URL (e.g., field 318). Computer system 700 may then use network interface 740 to access the relevant location and retrieve sets of item identifier 516, before storing them in system memory 720 as data 780.

At 910, process 900 (e.g., using one or more components described above) may enable computer system 700 to determine characteristics 518 associated with the sets of items. For example, characteristic determination subsystem 120 may determine one or more characteristics associated with a plurality of sets of items corresponding to the plurality of sets of item identifiers. For example, using the information from the sets of item identifiers stored as data 780, such as SKU codes, computer system 700 may utilize one or more of processors 710a-710n to determine a set of qualitative or quantitative characteristics associated with the sets of items and, in some embodiments, related to the particular user of the cryptography-based storage application. Instructions for this characteristic determination process may involve program instructions 770. Characteristic subsystem 120 may then deduce these characteristics by implementing thresholds, criteria, or requirements for a given characteristic. These characteristics may be stored in system memory 720, as data 780.

At 912, process 900 (e.g., using one or more components described above) may enable computer system 700 to generate new cryptographic token 520 that indicates the one or more characteristics 518. For example, token generation subsystem 114 may generate a new cryptographic token to be controlled by the cryptography-based storage application 502, wherein the new cryptographic token indicates the one or more characteristics. For example, based on determining that a particular user is "memory-efficient," based on associated sets of item identifiers, computer system 700, through one or more processors 710a-710n and through program instructions 770, may create a piece of digital artwork related to this designation, and may store this digital artwork in system memory 720. Token generation subsystem 114 may then generate a cryptographic token, such as an NFT, directed towards these characteristics or attributes, and provide access of the token to the cryptography-based storage application for which the system designated the particular characteristics.

It is contemplated that the operations or descriptions of FIGS. 8 and/or 9 may be used with any other embodiment of this disclosure. In addition, the operations and descriptions described in relation to FIGS. 8 and/or 9 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the operations in FIGS. 8 and/or 9.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for generating cryptographic tokens based on received records to enable users to securely share and control access to data will be better understood with reference to the following enumerated embodiments:

A1. A method for generating cryptographic tokens based on received records, the method comprising: receiving a blockchain operation request comprising a plurality of records, wherein each record of the plurality of records comprises an identifier of an item, and wherein the blockchain operation request is associated with a cryptography-based storage application; encrypting the plurality of records into an encrypted payload using a public key associated with the cryptography-based storage application; generating, based on the encrypted payload, a cryptographic token, wherein the cryptographic token is controlled by the cryptography-based storage application, and wherein the cryptographic token enables access to the encrypted payload using the cryptography-based storage application; and causing the cryptographic token to be committed to a blockchain and enabling a user associated with the cryptography-based storage application to provide access to the plurality of records.

A2. The method of the preceding embodiment, further comprising determining, based on a key identifier associated with the cryptography-based storage application, the public key associated with the cryptography-based storage application.

A3. The method of any one of the preceding embodiments, wherein generating, based on the encrypted payload, the cryptographic token comprises: setting an address associated with the cryptography-based storage application as a controlling address for the cryptographic token; and encoding the encrypted payload into the cryptographic token.

A4. The method of any one of the preceding embodiments, wherein generating, based on the encrypted payload, the cryptographic token comprises: generating a payload identifier associated with the cryptographic token, wherein the payload identifier enables retrieval of the encrypted payload; storing the encrypted payload in cloud storage in association with the payload identifier; and encoding the payload identifier into the cryptographic token.

A5. The method of any one of the preceding embodiments, wherein enabling the user associated with the cryptography-based storage application to provide the access to the plurality of records comprises: receiving a second blockchain operation request to transfer control of the cryptographic token to a second cryptography-based storage application; transmitting a command to a computing device associated with the cryptography-based storage application to decrypt the encrypted payload, wherein the computing device decrypts the encrypted payload using a private key associated with the cryptography-based storage application; receiving the plurality of records from the computing device; encrypting the plurality of records into a new encrypted payload using a second public key associated with the second cryptography-based storage application; and replacing the encrypted payload with the new encrypted payload.

A6. The method of any one of the preceding embodiments, wherein replacing the encrypted payload with the new encrypted payload comprises: retrieving the payload identifier; determining, based on the payload identifier, a location associated with the encrypted payload; and replacing, in the location associated with the encrypted payload, the encrypted payload with the new encrypted payload.

A7. The method of any one of the preceding embodiments, further comprising: receiving a second blockchain operation request comprising a second plurality of records; determining, based on a blockchain identifier associated with the second blockchain operation request, that the second blockchain operation request is associated with the cryptography-based storage application; encrypting the second plurality of records into a second encrypted payload using the public key associated with the cryptography-based storage application; and storing the second encrypted payload in a cloud-based storage, wherein the second encrypted payload is accessed using the cryptography-based storage application using the cryptographic token.

A8. The method of any one of the preceding embodiments, further comprising: adding a second payload identifier associated with the second encrypted payload to the cryptographic token; receiving a request to access entries associated with the cryptographic token; retrieving a first payload identifier associated with the plurality of records and the second payload identifier; and retrieving the encrypted payload and the second encrypted payload.

A9. A tangible, non-transitory, machine-readable medium storing instructions that, when executed by a data processing apparatus, cause the data processing apparatus to perform operations comprising those of any of embodiments A1-A8.

A10. A system comprising one or more processors; and memory storing instructions that, when executed by the processors, cause the processors to effectuate operations comprising those of any of embodiments A1-A8.

A11. A system comprising means for performing any of embodiments A1-A8.

A12. A system comprising cloud-based circuitry for performing any of embodiments A1-A8.

The present techniques for using encrypted blockchain-based data to determine user characteristics and generate corresponding cryptographic tokens will be better understood with reference to the following enumerated embodiments:

B1. A method comprising: generating and transmitting, to a blockchain node associated with a blockchain, a blockchain operation request for a plurality of encrypted payloads, wherein the blockchain operation request comprises one or more identifiers of one or more cryptographic tokens; receiving, from the blockchain node in response to the blockchain operation request, the plurality of encrypted payloads associated with the one or more cryptographic tokens, wherein the plurality of encrypted payloads has been encrypted using a first key associated with a cryptography-based storage application; decrypting, using a second key associated with the cryptography-based storage application, the plurality of encrypted payloads into a plurality of payload identifiers; retrieving, based on the plurality of payload identifiers, a plurality of sets of item identifiers; determining one or more characteristics associated with a plurality of sets of items corresponding to the plurality of sets of item identifiers; and generating a new cryptographic token to be controlled by the cryptography-based storage application, wherein the new cryptographic token indicates the one or more characteristics.

B2. The method of any one of the preceding embodiments, further comprising identifying the one or more cryptographic tokens controlled by the cryptography-based storage application associated with a user, wherein each cryptographic token encodes access data for accessing one or more sets of items.

B3. The method of any one of the preceding embodiments, wherein identifying the one or more cryptographic tokens controlled by the cryptography-based storage application comprises: receiving a first application identifier associated with the cryptography-based storage application and a second application identifier associated with an on-chain program, wherein the on-chain program was used to commit the one or more cryptographic tokens to the blockchain; and transmitting, to the blockchain node, a command to retrieve the one or more identifiers of the one or more cryptographic tokens, wherein the command instructs the blockchain node to retrieve any cryptographic tokens matching the first application identifier and the second application identifier.

B4. The method of any one of the preceding embodiments, wherein decrypting the plurality of encrypted payloads into the plurality of payload identifiers comprises: transmitting, to a user device associated with the cryptography-based storage application, a command to decrypt the plurality of payload identifiers, wherein the command comprises the plurality of payload identifiers and an application identifier associated with the cryptography-based storage application; and receiving, from the user device, the plurality of payload identifiers, wherein the user device decrypts the plurality of encrypted payloads into the plurality of payload identifiers using the second key associated with the cryptography-based storage application.

B5. The method of any one of the preceding embodiments, wherein decrypting the plurality of encrypted payloads into the plurality of payload identifiers comprises: retrieving, based on an application identifier associated with the cryptography-based storage application, the second key associated with the cryptography-based storage application; and decrypting the plurality of encrypted payloads into the plurality of payload identifiers using the second key associated with the cryptography-based storage application.

B6. The method of any one of the preceding embodiments, wherein retrieving, based on the plurality of payload identifiers, the plurality of sets of item identifiers comprises: transmitting, to the blockchain node, a command to retrieve the plurality of sets of item identifiers, wherein the command comprises the plurality of payload identifiers and an application identifier of an on-chain program used to commit the one or more cryptographic tokens to the blockchain; and receiving, from the blockchain node, the plurality of sets of item identifiers, wherein the blockchain node executes the on-chain program to retrieve the plurality of sets of item identifiers from a remote location.

B7. The method of any one of the preceding embodiments, wherein retrieving, based on the plurality of payload identifiers, the plurality of sets of item identifiers comprises: extracting, from the plurality of payload identifiers, a plurality of uniform resource identifiers; and retrieving the plurality of sets of item identifiers using the plurality of uniform resource identifiers.

B8. The method of any one of the preceding embodiments, wherein determining the one or more characteristics associated with the plurality of sets of items corresponding to the plurality of sets of item identifiers comprises: retrieving, using the plurality of sets of item identifiers, a corresponding item profile, wherein each item profile comprises a plurality of characteristics associated with each item; and determining the one or more characteristics associated with the plurality of sets of items based on characteristics within each item profile.

B9. A tangible, non-transitory, machine-readable medium storing instructions that, when executed by a data processing apparatus, cause the data processing apparatus to perform operations comprising those of any of embodiments B1-B8.

B10. A system comprising one or more processors and memory storing instructions that, when executed by the processors, cause the processors to effectuate operations comprising those of any of embodiments B1-B8.

B11. A system comprising means for performing any of embodiments B1-B8.

B12. A system comprising cloud-based circuitry for performing any of embodiments B1-B8.

What is claimed is:

1. A system for generating cryptographic tokens based on received records, the system comprising:
   one or more processors; and
   one or more non-transitory, computer-readable media comprising instructions that, when executed by the one or more processors, cause operations comprising:
      receiving a first blockchain operation request from a computing device, wherein the first blockchain operation request comprises a plurality of records and a first target address associated with a first cryptography-based storage application, and wherein each record of the plurality of records comprises an identifier of an item;
      determining, based on the first target address, a first public key associated with the first cryptography-based storage application and encrypting the plurality of records into a first encrypted payload using the first public key;
      generating, based on one or more characteristics associated with one or more items corresponding to one or more item identifiers that are retrievable based on one or more payload identifiers that include a payload identifier of the first encrypted payload and based on the first target address, a cryptographic token configured to be controlled by the first target address and enable access to the first encrypted payload for the first cryptography-based storage application associated with the first target address, wherein a characteristic, of the one or more characteristics, includes a designation relating one or more of a threshold, a criteria, or a requirement being satisfied to lead to a determination of the characteristic;
      causing the cryptographic token to be committed to a blockchain;
      receiving, from the computing device, a second blockchain operation request to transfer control of the cryptographic token to a second cryptography-based storage application associated with a second target address, wherein the second blockchain operation request comprises the second target address;
      transmitting a command to the computing device to decrypt the first encrypted payload, wherein the computing device decrypts the first encrypted payload using a first private key associated with the first cryptography-based storage application;
      receiving the plurality of records from the computing device;

determining, based on the second target address, a second public key associated with the second cryptography-based storage application and encrypting the plurality of records into a second encrypted payload using the second public key; and
replacing the first encrypted payload with the second encrypted payload.

2. The system of claim 1, wherein the instructions for generating the cryptographic token further cause the one or more processors to perform operations comprising:
setting the first target address as a controlling address for the cryptographic token; and
encoding the first encrypted payload into the cryptographic token.

3. The system of claim 1, wherein the instructions for generating the cryptographic token further cause the one or more processors to perform operations comprising:
generating the payload identifier, wherein the payload identifier enables retrieval of the first encrypted payload;
storing the first encrypted payload in cloud storage in association with the payload identifier; and
encoding the payload identifier into the cryptographic token.

4. The system of claim 3, wherein the instructions for replacing the first encrypted payload with the second encrypted payload further cause the one or more processors to perform operations comprising:
retrieving the payload identifier;
determining, based on the payload identifier, a location associated with the first encrypted payload; and
replacing, in the location associated with the first encrypted payload, the first encrypted payload with the second encrypted payload.

5. A method for generating cryptographic tokens based on received records, the method comprising:
receiving a blockchain operation request comprising a plurality of records, wherein each record of the plurality of records comprises an identifier of an item, and wherein the blockchain operation request is associated with a cryptography-based storage application;
encrypting the plurality of records into an encrypted payload using a public key associated with the cryptography-based storage application, wherein the encrypted payload is a first encrypted payload, and wherein the cryptography-based storage application is a first cryptography-based storage application;
generating, based on one or more characteristics associated with one or more items corresponding to one or more item identifiers that are retrievable based on one or more payload identifiers that include a payload identifier of the encrypted payload, a cryptographic token configured to be controlled by the cryptography-based storage application and enable access to the encrypted payload using the cryptography-based storage application, wherein a characteristic, of the one or more characteristics, includes a designation relating one or more of a threshold, a criteria, or a requirement being satisfied to lead to a determination of the characteristic;
causing the cryptographic token to be committed to a blockchain;
receiving, from a computing device, a second blockchain operation request to transfer control of the cryptographic token to a second cryptography-based storage application associated with a second target address, wherein the second blockchain operation request comprises the second target address;
transmitting a command to the computing device to decrypt the first encrypted payload, wherein the computing device decrypts the first encrypted payload using a first private key associated with the first cryptography-based storage application;
receiving the plurality of records from the computing device;
determining, based on the second target address, a second public key associated with the second cryptography-based storage application and encrypting the plurality of records into a second encrypted payload using the second public key; and
replacing the first encrypted payload with the second encrypted payload.

6. The method of claim 5, further comprising determining, based on a key identifier associated with the cryptography-based storage application, the public key associated with the cryptography-based storage application.

7. The method of claim 5, wherein generating the cryptographic token comprises:
setting an address associated with the cryptography-based storage application as a controlling address for the cryptographic token; and
encoding the encrypted payload into the cryptographic token.

8. The method of claim 5, wherein generating the cryptographic token comprises:
generating the payload identifier, wherein the payload identifier enables retrieval of the encrypted payload;
storing the encrypted payload in cloud storage in association with the payload identifier; and
encoding the payload identifier into the cryptographic token.

9. The method of claim 8, further comprising:
receiving a second blockchain operation request to transfer control of the cryptographic token to a second cryptography-based storage application;
transmitting a command to a computing device associated with the cryptography-based storage application to decrypt the encrypted payload, wherein the computing device decrypts the encrypted payload using a private key associated with the cryptography-based storage application;
receiving the plurality of records from the computing device;
encrypting the plurality of records into a new encrypted payload using a second public key associated with the second cryptography-based storage application; and
replacing the encrypted payload with the new encrypted payload.

10. The method of claim 9, wherein replacing the encrypted payload with the new encrypted payload comprises:
retrieving the payload identifier;
determining, based on the payload identifier, a location associated with the encrypted payload; and
replacing, in the location associated with the encrypted payload, the encrypted payload with the new encrypted payload.

11. The method of claim 5, further comprising:
receiving a second blockchain operation request comprising a second plurality of records;
determining, based on a blockchain identifier associated with the second blockchain operation request, that the second blockchain operation request is associated with the cryptography-based storage application;

encrypting the second plurality of records into a second encrypted payload using the public key associated with the cryptography-based storage application; and storing the second encrypted payload in a cloud-based storage, wherein the second encrypted payload is accessed using the cryptography-based storage application using the cryptographic token.

12. The method of claim 11, further comprising:

adding a second payload identifier associated with the second encrypted payload to the cryptographic token;

receiving a request to access entries associated with the cryptographic token;

retrieving a first payload identifier associated with the plurality of records and the second payload identifier; and retrieving the encrypted payload and the second encrypted payload.

13. The method of claim 5, wherein the characteristic is energy efficiency.

14. A non-transitory, computer-readable medium storing instructions that, when executed by one or more processors, cause the one or more processors to perform operations comprising:

receiving a blockchain operation request comprising a plurality of records, wherein each record of the plurality of records comprises an identifier of an item;

encrypting the plurality of records into an encrypted payload using a key associated with a cryptography-based storage application, wherein the encrypted payload is a first encrypted payload, and wherein the cryptography-based storage application is a first cryptography-based storage application;

generating, based on one or more characteristics associated with one or more items corresponding to one or more item identifiers that are retrievable based on one or more payload identifiers that include a payload identifier of the encrypted payload, a cryptographic token configured to be controlled by the cryptography-based storage application and enable access to the encrypted payload using the cryptography-based storage application, wherein a characteristic, of the one or more characteristics, includes a designation relating one or more of a threshold, a criteria, or a requirement being satisfied to lead to a determination of the characteristic;

causing the cryptographic token to be committed to a blockchain;

receiving, from a computing device, a second blockchain operation request to transfer control of the cryptographic token to a second cryptography-based storage application associated with a second target address, wherein the second blockchain operation request comprises the second target address;

transmitting a command to the computing device to decrypt the first encrypted payload, wherein the computing device decrypts the first encrypted payload using a first private key associated with the first cryptography-based storage application;

receiving the plurality of records from the computing device;

determining, based on the second target address, a second public key associated with the second cryptography-based storage application and encrypting the plurality of records into a second encrypted payload using the second public key; and replacing the first encrypted payload with the second encrypted payload.

15. The non-transitory, computer-readable medium of claim 14, wherein the instructions cause the one or more processors to determine, based on a key identifier associated with the cryptography-based storage application, the key associated with the cryptography-based storage application.

16. The non-transitory, computer-readable medium of claim 14, wherein the instructions for generating the cryptographic token further cause the one or more processors to perform operations comprising:

setting an address associated with the cryptography-based storage application as a controlling address for the cryptographic token; and encoding the encrypted payload into the cryptographic token.

17. The non-transitory, computer-readable medium of claim 14, wherein the instructions for generating the cryptographic token further cause the one or more processors to perform operations comprising:

generating the payload identifier, wherein the payload identifier enables retrieval of the encrypted payload;

storing the encrypted payload in cloud storage in association with the payload identifier; and encoding the payload identifier into the cryptographic token.

18. The non-transitory, computer-readable medium of claim 17, wherein the further cause the one or more processors to perform operations comprising:

receiving a second blockchain operation request to transfer control of the cryptographic token to a second cryptography-based storage application;

transmitting a command to a computing device associated with the cryptography-based storage application to decrypt the encrypted payload, wherein the computing device decrypts the encrypted payload using a private key associated with the cryptography-based storage application;

receiving the plurality of records from the computing device;

encrypting the plurality of records into a new encrypted payload using a second public key associated with the second cryptography-based storage application; and replacing the encrypted payload with the new encrypted payload.

19. The non-transitory, computer-readable medium of claim 18, wherein the instructions for replacing the encrypted payload with the new encrypted payload cause the one or more processors to perform operations comprising:

retrieving the payload identifier;

determining, based on the payload identifier, a location associated with the encrypted payload; and replacing, in the location associated with the encrypted payload, the encrypted payload with the new encrypted payload.

20. The non-transitory, computer-readable medium of claim 14, wherein the instructions cause the one or more processors to perform operations further comprising:

receiving a second blockchain operation request comprising a second plurality of records;

determining, based on a blockchain identifier associated with the second blockchain operation request, that the second blockchain operation request is associated with the cryptography-based storage application;

encrypting the second plurality of records into a second encrypted payload using the key associated with the cryptography-based storage application; and storing the second encrypted payload in a cloud-based storage, wherein the second encrypted payload is accessed using the cryptography-based storage application using the cryptographic token.

* * * * *